(12) United States Patent
Jiang

(10) Patent No.: US 7,363,109 B2
(45) Date of Patent: Apr. 22, 2008

(54) BACKLASH COMPENSATION CONTROL METHOD, BACKLASH COMPENSATION CONTROLLER AND BACKLASH COMPENSATION CONTROL PROGRAM

(75) Inventor: Shan Jiang, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/133,368

(22) Filed: May 20, 2005

(65) Prior Publication Data

US 2005/0217406 A1 Oct. 6, 2005

Related U.S. Application Data

(63) Continuation of application No. PCT/JP03/06265, filed on May 20, 2003.

(51) Int. Cl.
G06F 19/00 (2006.01)
(52) U.S. Cl. .................................................. 700/245
(58) Field of Classification Search ............ 74/490.01; 901/50; 700/245–264
See application file for complete search history.

(56) References Cited

U.S. PATENT DOCUMENTS

| | | | | |
|---|---|---|---|---|
| 4,507,046 | A * | 3/1985 | Sugimoto et al. ............ 414/735 |
| 4,662,814 | A * | 5/1987 | Suzuki et al. ............... 414/730 |
| 4,855,564 | A | 8/1989 | Hawkins et al. | |
| 5,085,619 | A | 2/1992 | Torii et al. | |
| 5,162,713 | A | 11/1992 | Mohri et al. | |
| 5,204,602 | A * | 4/1993 | Iwashita ..................... 318/630 |
| 5,245,263 | A * | 9/1993 | Tsai et al. ................. 318/568.1 |
| 5,294,873 | A * | 3/1994 | Seraji ....................... 318/568.1 |
| 5,523,662 | A * | 6/1996 | Goldenberg et al. ... 318/568.11 |
| 5,946,449 | A * | 8/1999 | Dickerson et al. .......... 700/260 |
| 6,107,771 | A * | 8/2000 | Maeda ....................... 318/630 |
| 6,233,504 | B1 * | 5/2001 | Das et al. ................... 700/260 |
| 6,374,484 | B1 | 4/2002 | Yoshida et al. | |
| 6,377,011 | B1 * | 4/2002 | Ben-Ur ....................... 318/566 |

(Continued)

FOREIGN PATENT DOCUMENTS

JP 58-217015 12/1983

(Continued)

OTHER PUBLICATIONS

Ricard C. Dorf and Robert H. Bishop, Modern Control Systems, 2000, Prentice-Hall, Inc., 9th ed, pp. 173-175.*

*Primary Examiner*—Richard Ridley
*Assistant Examiner*—James Pilkington
(74) *Attorney, Agent, or Firm*—Westerman, Hattori, Daniels & Adrian, LLP.

(57) ABSTRACT

To allow a robot performing a cyclic movement upon receipt of a driving force transmitted through a driving force transmission system from a driving source along with a backlash to perform the movement compensated for the backlash, during a first period within a cycle of the movement of the robot, a predetermined first movement control value is repeatedly cumulatively added with a correction value so as to be gradually biased to a predetermined second movement control value over the first period, and during a second period within that cycle, a correction value is repeatedly cumulatively subtracted from the second movement control value so as to gradually return to the first movement control value over the second period, thereby generating the movement control value for controlling the movement of the robot, and based on the movement control value thus generated, the movement of the robot is controlled.

6 Claims, 19 Drawing Sheets

U.S. PATENT DOCUMENTS

| | | | |
|---|---|---|---|
| 6,566,837 B1 * | 5/2003 | Zhang et al. | 318/610 |
| 6,720,393 B1 | 4/2004 | George et al. | |
| 6,889,115 B2 * | 5/2005 | Shiba et al. | 700/186 |
| 2002/0127115 A1 * | 9/2002 | Lucke et al. | 417/12 |
| 2004/0122556 A1 | 6/2004 | Mori et al. | |

FOREIGN PATENT DOCUMENTS

| | | |
|---|---|---|
| JP | 62-84310 | 4/1987 |
| JP | 62-140784 | 6/1987 |
| JP | 63-72969 | 4/1988 |
| JP | 2-20678 | 1/1990 |
| JP | 2-110744 | 9/1990 |
| JP | 2-232192 | 9/1990 |
| JP | 3-136780 | 6/1991 |
| JP | 3-287389 | 12/1991 |
| JP | 4-90209 | 8/1992 |
| JP | 6-206354 | 7/1994 |
| JP | 7-40159 | 2/1995 |
| JP | 7-100781 | 4/1995 |
| JP | 7-132485 | 5/1995 |
| JP | 7-200018 | 8/1995 |
| JP | 7-248047 | 9/1995 |
| JP | 8-71966 | 3/1996 |
| JP | 10-76488 | 3/1998 |
| JP | 10-94986 | 4/1998 |
| JP | 10-154007 | 6/1998 |
| JP | 11-134012 | 5/1999 |
| WO | WO99/12406 | 3/1999 |
| WO | WO03/011535 | 2/2003 |

* cited by examiner

BACKLASH COMPENSATION CONTROL METHOD, BACKLASH COMPENSATION CONTROLLER AND BACKLASH COMPENSATION CONTROL PROGRAM

This application is a continuation of international application PCT/JP2003/006265 filed on May 20, 2003.

TECHNICAL FIELD

The present invention relates to a backlash compensation control method which allows a robot performing a cyclic movement upon receipt of a driving force transmitted through a driving force transmission system including, for example, gears and the like which transmit a driving force from a driving source along with a backlash to perform a movement compensated for backlash, a backlash compensation controller, and a backlash compensation control program storage medium that stores a backlash compensation control program which allows a computer executing a program to operate as such a backlash compensation controller.

BACKGROUND ART

In recent years, in general, an electric motor has been widely used as a movement control actuator of the joints of a robot. Further, to drive the robot by a sufficient power, in a robot mechanism system, various gear systems have been applied as a driving force transmission system for transmitting the driving force of the electric motor. Here, between gears, there exists a space, and consequently, there exists a backlash in the driving force transmission system using the gears. However, for example, in many robots such as a biped walking robot, the movement direction (rotational direction) of the joints reciprocally changes, and a non-linear undesirable movement occurs due to the backlash, and this is a common factor of an accurate limit of the positional (attitude) control of the joints of the robot. Particularly in the case of biped walking control of the biped walking robot, since the backlash of the joints affects the positional (attitude) control, it aggravates stability of mobile movements.

With regard to the backlash problem, in Patent Document 1, there has been proposed a technique, which is provided with a sensor for detecting a magnitude of the backlash so as to measure the backlash, and reports in case the backlash increases due to wear by aged deterioration of the gears. Further, in Patent Document 2, there has been disclosed a technique, which is provided with a zero point sensor for detecting the zero point position of movement portion of the robot, and accurately finds mechanical zero point position so as to reduce the effect of the backlash.

(Patent Document 1) Japanese Patent Laid-Open Publication No. 8-71966

(Patent Document 2) Japanese Patent Laid-Open Publication No. 10-76488

As described above, the backlash due to the gear and the like brings about instability of movement in case a highly accurate positional control is performed, and for example, in the case of the biped walking robot, there are the cases where it falls down by a slight disturbance because of unstable movement, and expected movement may not be accomplished.

In contrast to this, the technique as proposed in the Patent Document 1 is nothing more than measuring the backlash, and does not suppress the backlash small in a normal state. While the technique disclosed in the cited Document 2 attempts to detect a zero point position, and though effective for the movement control without disturbance, in case it receives an external force, for example, in case a reactive force from the floor such as thrusting a foot against the floor, raising a foot from the floor, and the like in addition to the driving force from the electric motor such as a biped walking control and the like of the biped walking robot changes, no matter how hard the zero point position is detected, there is no avoiding the occurrence of careless and irregular movements due to existence of the backlash and the external change.

Further, it is necessary to mount a sensor for measuring the backlash in the case of the Patent Document 1, and a zero point sensor in the case of the Patent Document 2, and a change of hardware is required.

An object of the present invention, in view of the circumstances, is to provide a backlash compensation control method and a backlash compensation controller which control appearance of the backlash in the movement even when a driving force transmission system has a backlash, and can perform a movement control to compensate for the backlash, and a backlash compensation control program storage medium that stores a backlash compensation control program which allows a computer to operate as such backlash compensation controller.

DISCLOSURE OF THE INVENTION

The backlash compensation control method of the present invention which achieves the object allows a robot performing a cyclic movement upon receipt of a driving force transmitted through a driving force transmission system for transmitting the driving force from the driving source along with a backlash to perform the movement compensated for the backlash, and includes:

a first step of generating a movement control value for controlling the movement of the robot, in which, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period when a fault movement caused by the backlash within that cycle is possible to occur, a predetermined second correction value is repeatedly cumulatively subtracted from the second movement control value so as to gradually return to the predetermined first movement control value over the second period; and a second step of controlling the movement of the robot based on the movement control value thus generated.

Here, the first movement control value and the second movement control value are movement control values for controlling the movement of the robot, and are movement control values which typically changes with time.

Further, the first and second periods may be periods which mutually have the same time width, and consequently, the first correction value and the second correction value may be mutually the same correction value.

Here, the "robot" may preferably "perform a cyclic movement upon receipt of a driving force transmitted through a driving force transmitting system for transmitting the driving force from a driving source", and for example, a manipulator and the like which accord with this definition fall under the category of a robot so-called here. The present invention, among from the robots accorded with this definition, takes "the robot performing a cyclic movement upon receipt of a driving force transmitted through a driving force transmitting system for transmitting the driving force from a driving source along with the backlash" as a control object.

The backlash compensation method of the present invention cumulatively adds and cumulatively subtracts the correction values, respectively, during the predetermined first and second periods in which a fault movement is possible to occur, so that the backlash is effectively compensated as shown in the embodiment to be described later and a stabilized movement can be accomplished. Moreover, the backlash compensation control method of the present invention requires no mechanical modification of the robot and makes it possible to perform a low-cost control.

Here, preferably, the backlash compensation control method of the present invention includes:

a third step, in which the same algorism as the movement control value generating algorism in the first step is used, and at the same time, by using each of plural mutually different correction values as the correction values corresponding to the first correction value in the first step, a moving test of the robot is performed, thereby finding a corresponding relation between the correction value and a degree of the compensation of the backlash; and a fourth step of finding a correction value by which the compensation of the backlash is adequately performed based on the corresponding relation.

In the first step, it is preferable that the correction value found in the fourth step is applied as the first correction value.

Although the "moving test" referred to here may be performed by the control object robot by itself, it is not necessarily performed by the control object robot by itself, and it may be performed by a typical robot set among from the same type of the robots produced in a large quantity, for example, a proto type robot or the moving test may be performed not by the robot actually assembled but by a moving simulation of the robot constructed on the data inside a computer.

Although the correction value for compensating the backlash may be searched by trial and error so as to obtain an adequate correction value, through the third and fourth steps, the adequate correction value can be easily obtained, and through application of the correction value in the first step, the backlash can be effectively compensated.

Further, the backlash compensation controller of the present invention, which achieves the object, allows a robot performing a cyclic movement upon receipt of a driving force transmitted through a driving force transmission system for transmitting the driving force from the driving source along with a backlash to perform the movement compensated for the backlash, and includes:

a movement control value generating section for generating a movement control value for controlling the movement of the robot, in which, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period when a fault movement caused by the backlash within that cycle is possible to occur, a predetermined second correction value is repeatedly cumulatively subtracted from the second movement control value so as to gradually return to the predetermined first movement control value over the second period; and a movement control section for controlling the movement of the robot based on the movement control value thus generated.

Further, a backlash compensation control program storage medium of the present invention to achieve the object stores a backlash compensation control program that is executed within a computer which executes the program, in which the computer allows a robot performing a cyclic movement upon receipt of a driving force transmitted through a driving force transmission system for transmitting the driving force from the driving source along with a backlash to operate as a backlash compensation controller that is allowed to perform the movement compensated for the backlash, allowing the computer to operate as the backlash compensation controller, including:

a movement control value generating section for generating a movement control value for controlling the movement of the robot, in which, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period when a fault movement caused by the backlash within that cycle is possible to occur, a predetermined second correction value is repeatedly cumulatively subtracted from the second movement control value so as to gradually return to the predetermined first movement control value over the second period; and a movement control section for controlling the movement of the robot based on the movement control value generated in the movement control value generating section.

BEST MODE FOR CARRYING OUT THE INVENTION

Embodiments of the present invention will be described below.

A backlash compensation controller as one embodiment of the present invention to be described below is constituted by a combination of one set of computer and a backlash compensation control program as one embodiment of the present invention which operates within the computer, and a backlash compensation control method as one embodiment of the present invention is executed through the use of the computer.

Now, first, hardware of the computer constituting the backlash compensation controller as one embodiment of the present invention will be described below.

Figure 1:
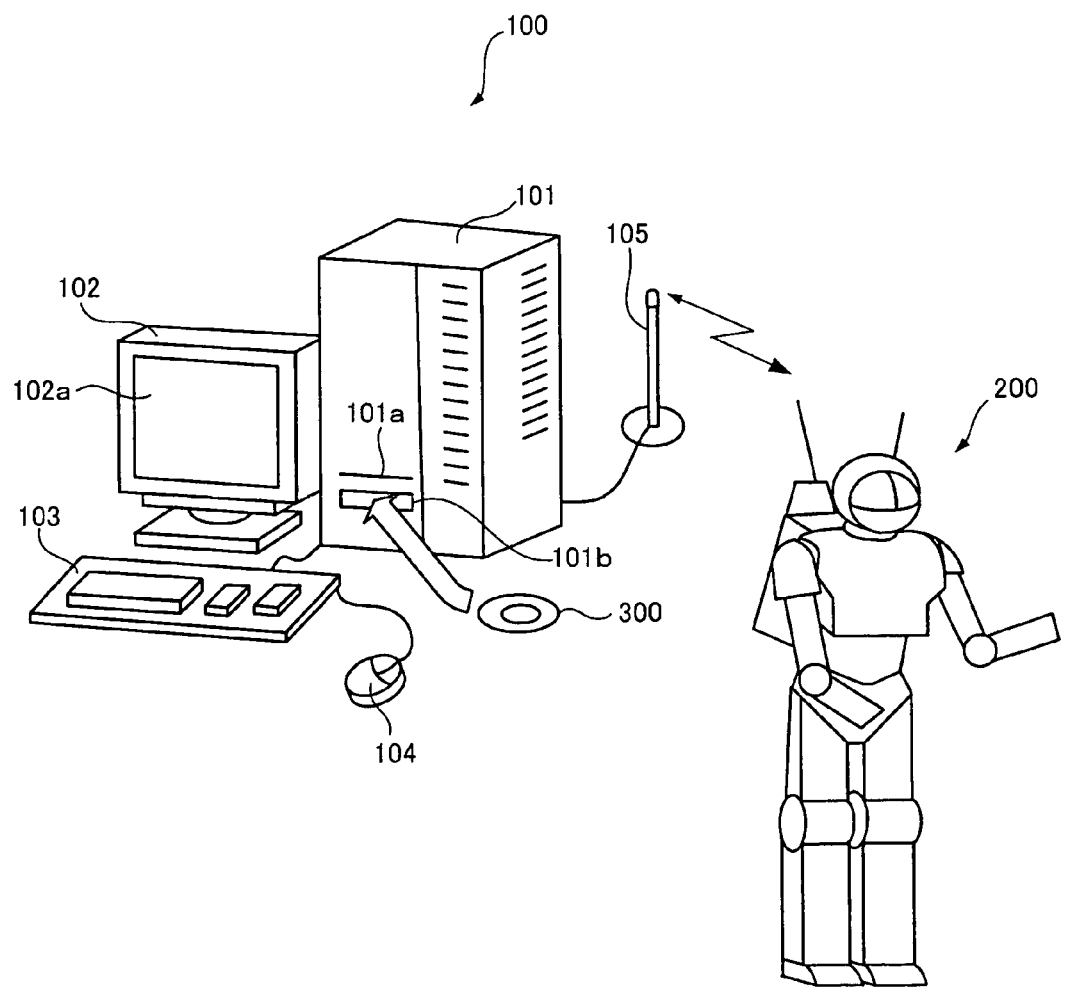
FIG. 1 is an external view of a computer and a robot performing a communication with the computer.

FIG. 1 is an external view of a computer and a robot performing a communication with the computer.

The computer 100 shown in FIG. 1 includes: a CPU (central processing unit); a RAM (random access memory); a hard disc; a main body section 101 built with a communication board and the like; a display device 102 for displaying an image and a character string on a display screen 102a by the instruction from the main body section 101; a keyboard 103 for inputting the instruction of an operator on the computer 100; a mouse 104 for inputting the instruction corresponding to an icon and the like displayed at the designating time and position through the designation of an arbitrary position on the display screen 102a; and an antenna 105 for performing a communication with a robot 200.

The main body section 101 further externally includes a FD loading gate 101a and a CD-ROM loading gate 101b into which a flexible disc (not shown) and a CD-ROM 300 are loaded, respectively. In the interiors thereof, there are built a FD drive as well as a CD-ROM drive which drive and access a flexible disc (FD) and a CD-ROM 300 loaded from those loading gates 101a and 101b.

In the meantime, the robot 200 has a form emulating the human body, and has a joint with an adjustable angle between two members at the portion equivalent to the joint of the human body, and moreover, is provided with various types of sensors such as a camera at the portion corresponding to the human eye, a microphone at the portion corresponding to the human ear, and a touch sensor at the portion equivalent to the human fingers. Further, this robot has a built-in communication equipment, and is constituted such that it performs a communication with the computer 100, and transmits information of various sensors toward the computer 100, and receives a control signal from the computer 100, and based on the control signal, performs movement such as a biped walking and the like.

This computer 100 is built with a robot constructed on the algorism which is equivalent to the robot 200, and a control algorism to control the movement of the robot 200 is not immediately used for movement control of the robot 200, but first, the robot as the algorism constructed within the computer 100 is moved by its control algorism so as to perform a moving simulation, and after having confirmed the performance of the movement as intended, the control algorism is applied to the robot 200 prepared hardware wise.

Figure 2:
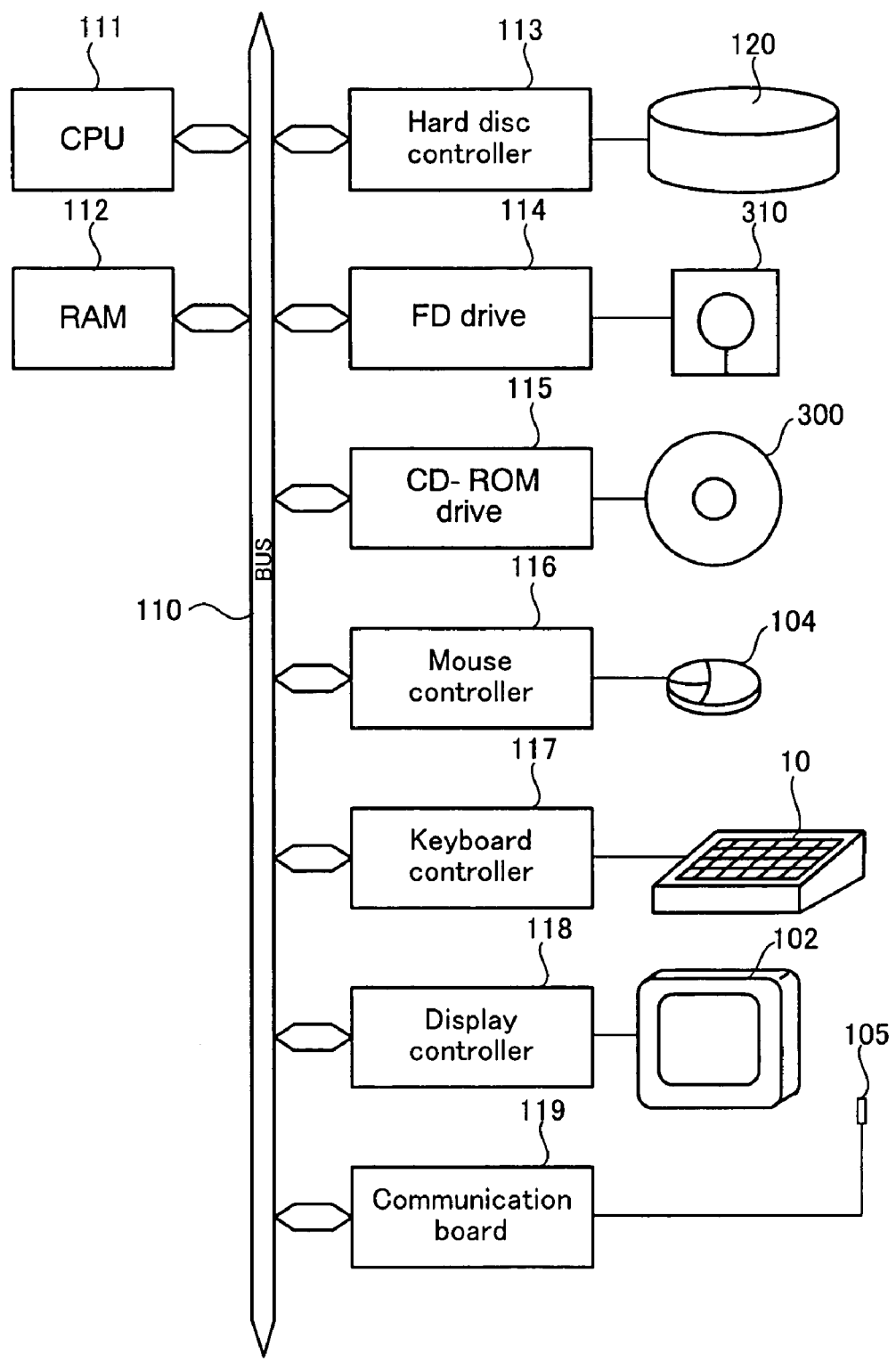
FIG. 2 is a hardware block diagram of the computer shown in FIG. 1.

FIG. 2 is a hardware block diagram of the computer shown in FIG. 1.

In this hardware block diagram is shown a CPU 111, a RAM 112, a hard disc controller 113, a FD drive 114, a CD-ROM drive 115, a mouse controller 116, a keyboard controller 117, a display controller 118, and a communication board 119 for performing a communication with the robot 200 (see FIG. 1), all of which are mutually connected through a bus 110.

The FD drive 114 and CD-ROM drive 115, as described with reference to FIG. 1, are the drives to access a FD310 and a CD-ROM 300 loaded from the FD loading gate 101a and the CD-ROM loading gate 101b, respectively. The communication board 119 performs a communication with the robot 200 through an antenna 105.

Further, in FIG. 2 is shown a hard disc 120 accessed by the hard disc control 113, the mouse 104 controlled by the mouse controller 116, the keyboard 103 controlled by the keyboard controller 117, and also the display device 102 controlled by the display controller 118.

Figure 3:
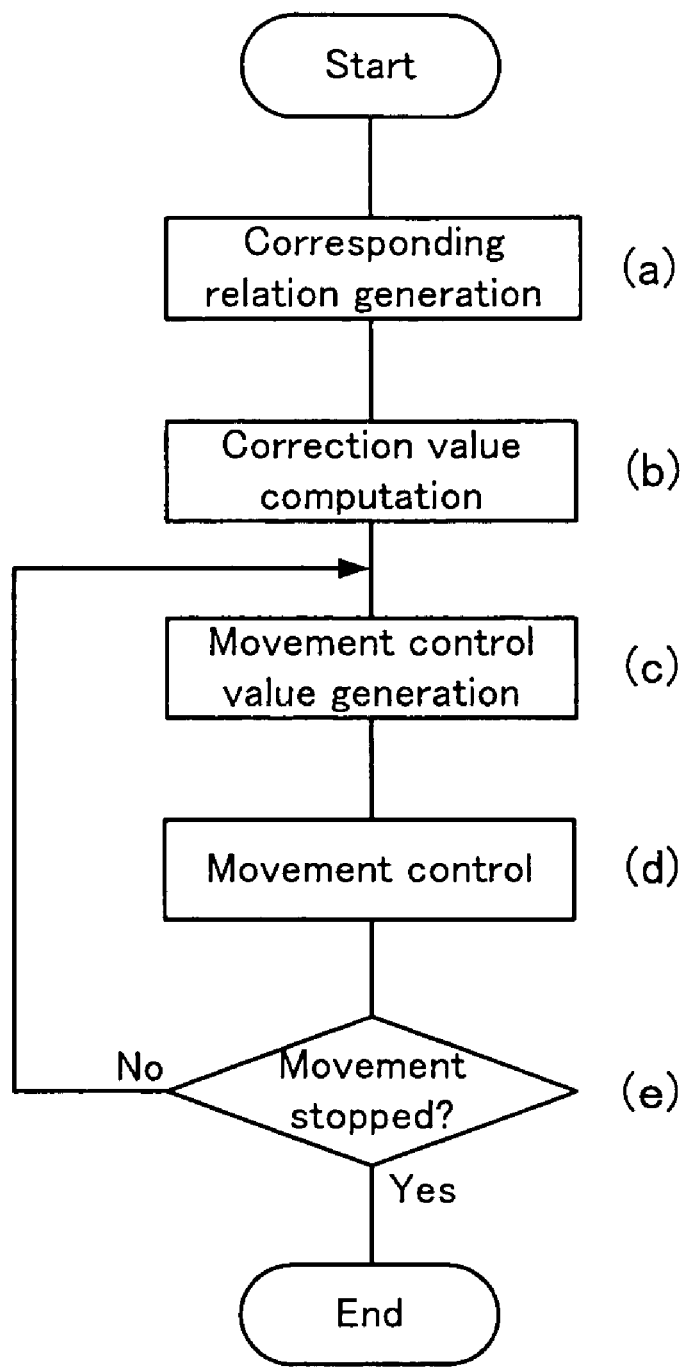
FIG. 3 is a flowchart showing one embodiment of a backlash compensation control method of the present invention.

FIG. 3 is a flowchart showing one embodiment of the backlash compensation control method of the present invention.

The backlash compensation control method shown in the flowchart of FIG. 3 is constituted by a corresponding relation generating step (step (a)), a correction value calculating step (step (b)), a movement control value generating step (step (c)), and a movement control step (step (d)).

Here, with respect to each step (a) to (d), its outline only will be described, and the detail thereof will be described later together with the description of the backlash compensation controller and the backlash compensation control program of the present invention. Further, here, for convenience of description, the movement control value generating step (step (c)) and the movement control step (step (d)) will be described first.

The backlash compensation control method shown in the flowchart of FIG. 3 is a method for allowing the robot shown in FIG. 1 to perform the movement compensated for the backlash.

In this movement control value generating step (step (c)) of the backlash compensation control method, a movement control value for controlling the movement of the robot is generated, in which, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period when a fault movement caused by the backlash within that cycle is possible to occur, a predetermined second correction value is repeatedly cumulatively subtracted from the second movement control value so as to gradually return to the predetermined first movement control value over the second period.

Further, in the movement control step (step (d)), based on the movement control value generated in the movement control value generating step (step (c)), the movement of the robot 200 is controlled.

Here, the first movement control value and the second movement control value are typically the movement control value which changes with time.

Further, in the present embodiment, the first and second periods are periods mutually having the same time width, and the first correction value and the second correction value are mutually the same compensation value.

Although step (c) and step (d) may be a so-called sequence control in which, after the generation of the movement control value of step (C) is completed for the entire period, step (d) is executed, here, both steps may be a so-called on-line control (step (e)) in which a processing is repeated for short unit time intervals where the movement control value at a point of time at step (c) is generated, and the movement control value at a point of time at step (d) is generated.

Further, the corresponding relation generating step (step (a)) and the correction value calculating step (step (b)) of the backlash compensation control method shown in the flowchart of FIG. 3 are the steps executed at the preliminary stage before actually controlling the robot.

Here, in the corresponding relation generating step of step (a), the same algorism as the movement control value generating algorism in the movement control value generating step of step (c) is used, and the moving test of the robot is performed by using each of plural different correction values as the correction value corresponding to the first correction value (the second correction value is also the same value in the present embodiment) in step (c), thereby finding the corresponding relation between the correction value and a degree of the compensation of the backlash.

Although the moving test here may be performed by the robot 200 by itself shown in FIG. 1, in the present embodiment, the moving test by moving simulation of the robot as the algorism constructed on the data within the computer 100 is performed.

Further, in the correction value calculating step of step (b), based on the corresponding relation, the correction value by which the compensation of the backlash is adequately performed is found.

In step (c), the correction value thus found is adapted.

The details of each step (a) to (d) of the flowchart of FIG. 3 will be described later.

Figure 4:
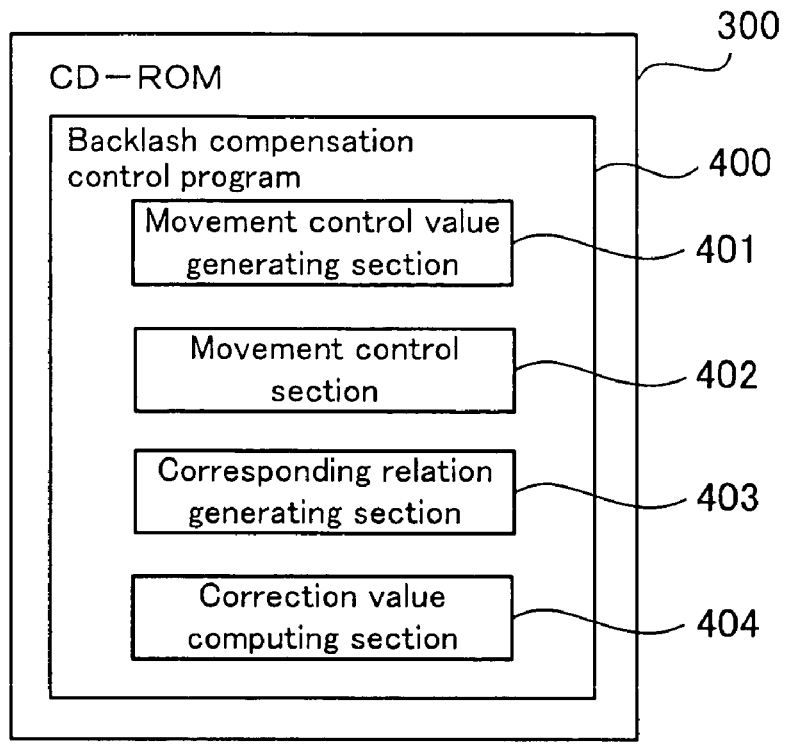
FIG. 4 is a schematic illustration showing the outline of one embodiment of a backlash compensation control program storage medium of the present invention.

FIG. 4 is a schematic illustration showing the outline of one embodiment of a backlash compensation control program storage medium of the present invention.

Here, this backlash compensation program 400 is stored in the CD-ROM 300 that is one embodiment of a backlash compensation program storage medium according to the present invention, and this CD-ROM 300 is loaded from the CD-ROM loading gate 101b shown in FIG. 1 and accessed by the CD-ROM drive 115 of FIG. 2, and the backlash control program 400 stored in the CD-ROM 300 is installed in the computer 100 shown in FIGS. 1 and 2. When the backlash compensation program 400 installed within the computer 100 is executed within the computer 100, the computer 100 operates as one embodiment of the backlash compensation controller of the present invention.

Although an example in which this backlash compensation control program 400 is stored in the CD-ROM 300 is shown, the program has no need to be stored in the CD-ROM, and for example, the program may be stored in other transportable storage mediums such as a FD and the like and installed in the computer or may be installed in the computer 100 from other devices and the like through a communication network (not shown) or may be stored in the hard disc (see FIG. 2) and the like of the computer 100 from the very beginning, and if executable by the computer eventually, it does not matter how reserved or stored the program is.

The backlash compensation control program 400 shown in FIG. 4 is constituted by a movement control value generating section 401, a movement control section 402, a corresponding relation generating section 403, and a correction value computing section 404. The operation of each section 401 to 404 of this backlash compensation control program 400 will be described together with the description of FIG. 5.

Figure 5:
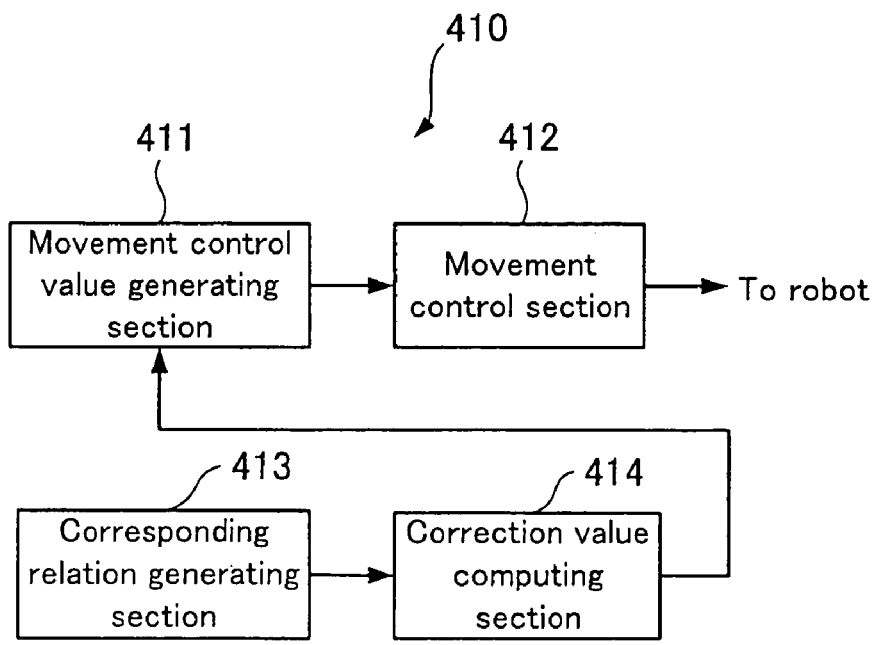
FIG. 5 is a block diagram showing one embodiment of a backlash compensation controller of the present invention.

FIG. 5 is a block diagram showing one embodiment of a backlash compensation controller of the present invention.

This backlash compensation controller 410 is realized within the computer 100 shown in FIGS. 1 and 2 with the backlash compensation control program 400 shown in FIG. 4 executed within the computer 100 shown in FIGS. 1 and 2.

This backlash compensation controller 410 of FIG. 5 is constituted by a movement control value generating section 411, a movement control section 412, a corresponding relation generating section 413, and a correction value computing section 414. Although each of these sections 411 to 414 corresponds to each of the sections 401 to 404 which constitute the backlash compensation control program 400 shown in FIG. 4, while each of the sections 411 to 414 of the backlash compensation controller 410 of FIG. 5 is constituted by the hardware of the computer 100 shown in FIGS. 1 and 2, an operating system (OS) executed within the computer 100, and a combination of each of the sections 401 to 404 of the backlash compensation program 400 shown in FIG. 4 which operates on that OS, each of the sections 401 to 404 of the backlash compensation control program 400 shown in FIG. 5 is constituted only by the portion of an application program within those compositions. An operation of each of the sections 401 to 404 constituting the backlash compensation control program 400 shown in FIG. 5 at the time when the backlash compensation control program 400 is executed within the computer 100 of FIGS. 1 and 2 is an operation itself of each of the sections 411 to 414 constituting the backlash compensation controller 410 shown in FIG. 5. Hereinafter, describing the operation of each of the sections 411 to 414 of the backlash compensation controller 410 of FIG. 5 should serve as the description of the operation of each of the sections 401 to 404 of the backlash compensation control program 400 of FIG. 4.

However, here, only an outline is given first, and after that, the embodiment of the present invention will be described more in detail.

The backlash compensation controller 410 shown in FIG. 5 is a backlash compensation controller, which allows the robot 200 shown in FIG. 1, that is, the robot, which performs a cyclic movement upon receipt of a driving force transmitted through a driving force transmission system for transmitting the driving force from the driving source along with a backlash, to perform the movement compensated for the backlash.

In this movement control value generating section 411 of the backlash compensation controller 410, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period (in the present embodiment, this second period is a period having the same time width as the first period) when a fault movement caused by the backlash within that cycle is possible to occur, a predetermined second correction value (in the present embodiment, this second correction value is the same value as the first correction value) is repeatedly cumulatively subtracted from the second movement control value so as to gradually return to the predetermined first movement control value over the second period, thereby the movement control value for controlling the movement of the robot is generated.

In the movement control section 412, based on the movement control value generated in the movement control value generating section 411, the movement of the robot 200 is controlled.

Further, the corresponding relation generating section 413 and the correction value computing section 414 are executed not at the stage of controlling the robot, but executed at the preliminary stage of that control, and in the corresponding relation generating section 413, the same algorism as the movement control value generating algorism used in the movement control value generating section 411 is used, and at the same time, by using each of plural mutually different correction values as the correction value corresponding to the first correction value (the second correction value is also the same in the present embodiment) used in the movement control value generating section 411, the moving test of the robot is performed, thereby finding the corresponding relation between the correction value and a degree of the compensation of the backlash.

In the correction value computing section 414, based on the corresponding relation generated at the corresponding relation generating section 413, the correction value by which the compensation of the backlash is adequately performed is found, and on the occasion of the actual control of the robot, the correction value thus found is applied in the movement control value generating section 411.

As the moving test of the robot, the moving simulation of the robot on the data constructed within the computer 100 is performed.

The embodiment of the present invention will be described below more in detail.

Figure 6:
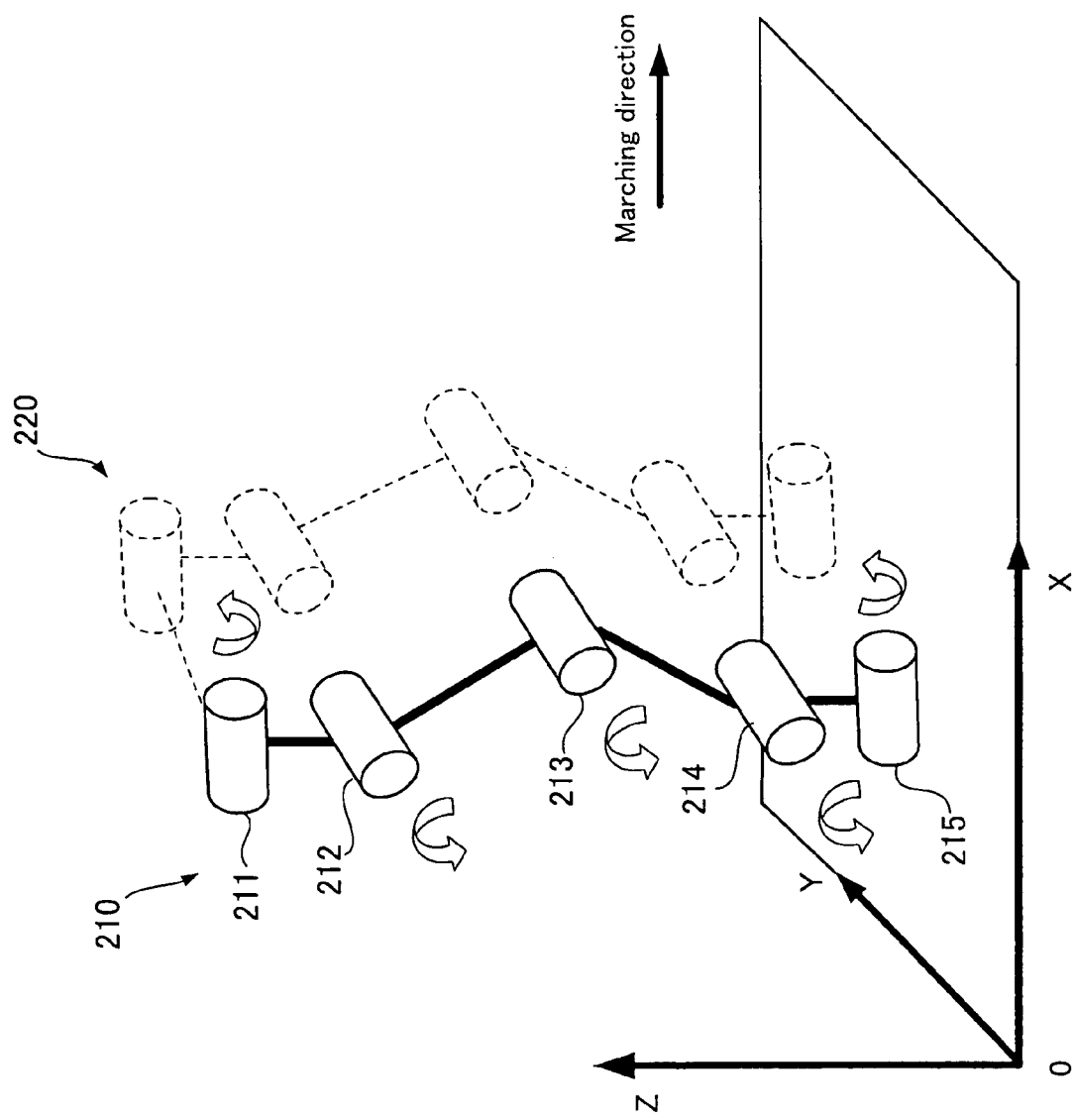
FIG. 6 is a view showing a model of two feet of a robot 200 shown in FIG. 1.

FIG. 6 is a view showing a model of both feet of the robot 200 shown in FIG. 1.

In FIG. 6 is shown a right foot 210 by a solid line, and at the same time, a left foot 220 by a broken line. The right foot 210 and the left foot 220 have a symmetrical structure, and here, a description will be focused on the right foot 210. The right foot 210 is provided with five joints 211 to 215. From among the five joints, three joints 212, 213, and 214 take charge of the movement in a traveling direction shown by an arrow mark in FIG. 6, that is, the movement within a X-Z plane (this is referred to as 'pitch'), and the remaining two joints 211 and 215 take charge of the movement within a Y-Z plane (this is referred to as 'roll') which is vertical to the traveling direction. The joint 211 is a joint, which takes charge of the movement of a hip if compared to a human body, and hereinafter, this joint 211 will be referred to as a hip roll joint 211. Further, the joint 215 is a joint, which takes charge of the movement of an ankle if compared to a human body, and hereinafter, this joint 215 will be referred to as a ankle roll joint 215.

Figure 7:
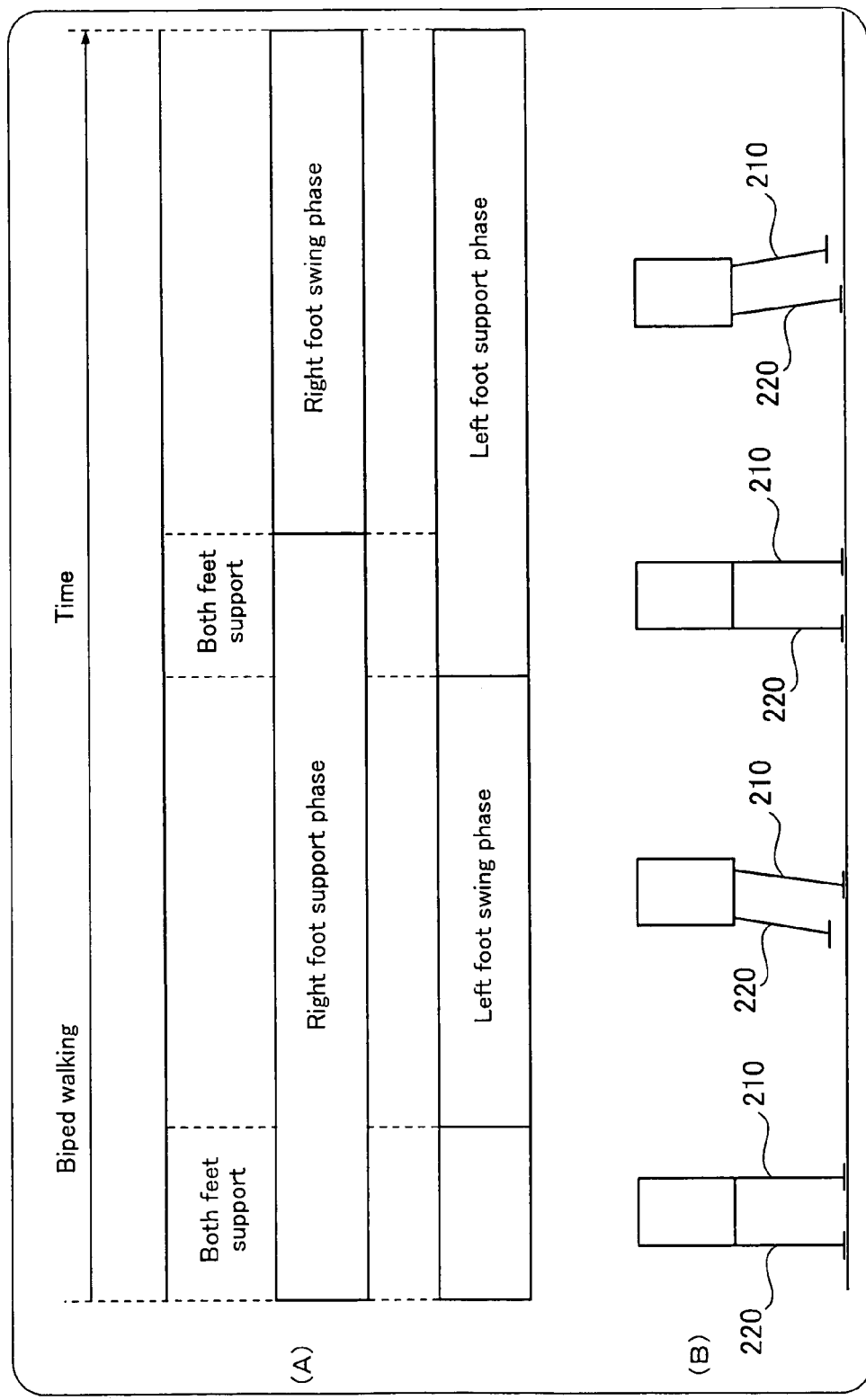
FIG. 7 is a view showing each phase of biped walking of the robot of FIG. 6.

FIG. 7 is a view showing each phase of the biped walking of the robot of FIG. 6.

First, a support phase of both feet is started in which both left and right feet 210 and 220 touch on the floor, and after that, it moves to a phase of moving the left foot 220 back and forth supported by one leg of the right foot 210 (moving back and forth in this manner is referred to as 'swing'), and after that again, it becomes the support phase of both feet in which both left and right feet 210 and 220 touch on the floor, and next, it moves to a swing phase in which the right foot 210 is swung supported by one leg of the left foot 220. Thus, through repetition of these movements, the biped walking is performed. In the case of the swing phase in which the left foot is swung supported by one leg of the right foot 210, the center of gravity moves to the right foot side, and in the case of the swing phase in which the right foot is swung supported by one leg of the left foot, the center of gravity moves to the left foot side. At this time, it is important that the trunk of the robot does not incline, but keeps a state of standing up vertically. This point will be described later.

Figure 8:
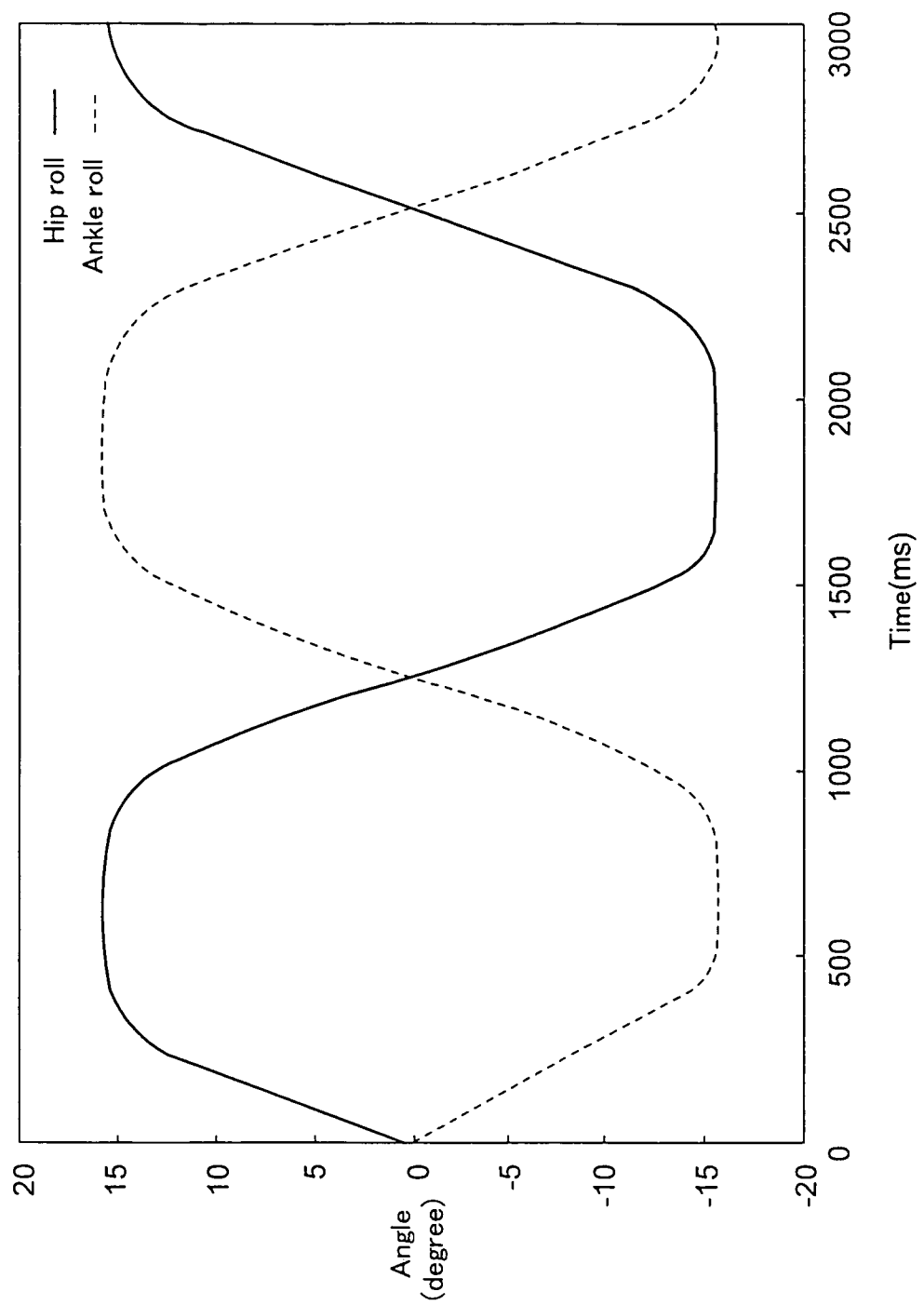
FIG. 8 is a view showing control angles of a hip roll joint and an ankle roll joint shown in FIG. 6 of a right foot in the biped walking time schematically shown in FIG. 7.

FIG. 8 is a view showing control angles of the hip roll joint 211 and the ankle roll joint 215 shown in FIG. 6 of the right foot in the biped walking shown schematically in FIG. 7.

Here, two step walking (one step each of the left and right foot) is performed, and during that time, the hip roll joint 211 and the ankle roll joint 215 of the right foot are controlled to angles shown by the solid line and the broken line, respectively, and by this control, as shown in part (B) of FIG. 7, the transfer of the center of gravity to the left and right is performed while the trunk is vertically kept. However, at this time, the backlash of each of the joint 211 and 215 cause a problem.

Figure 9:
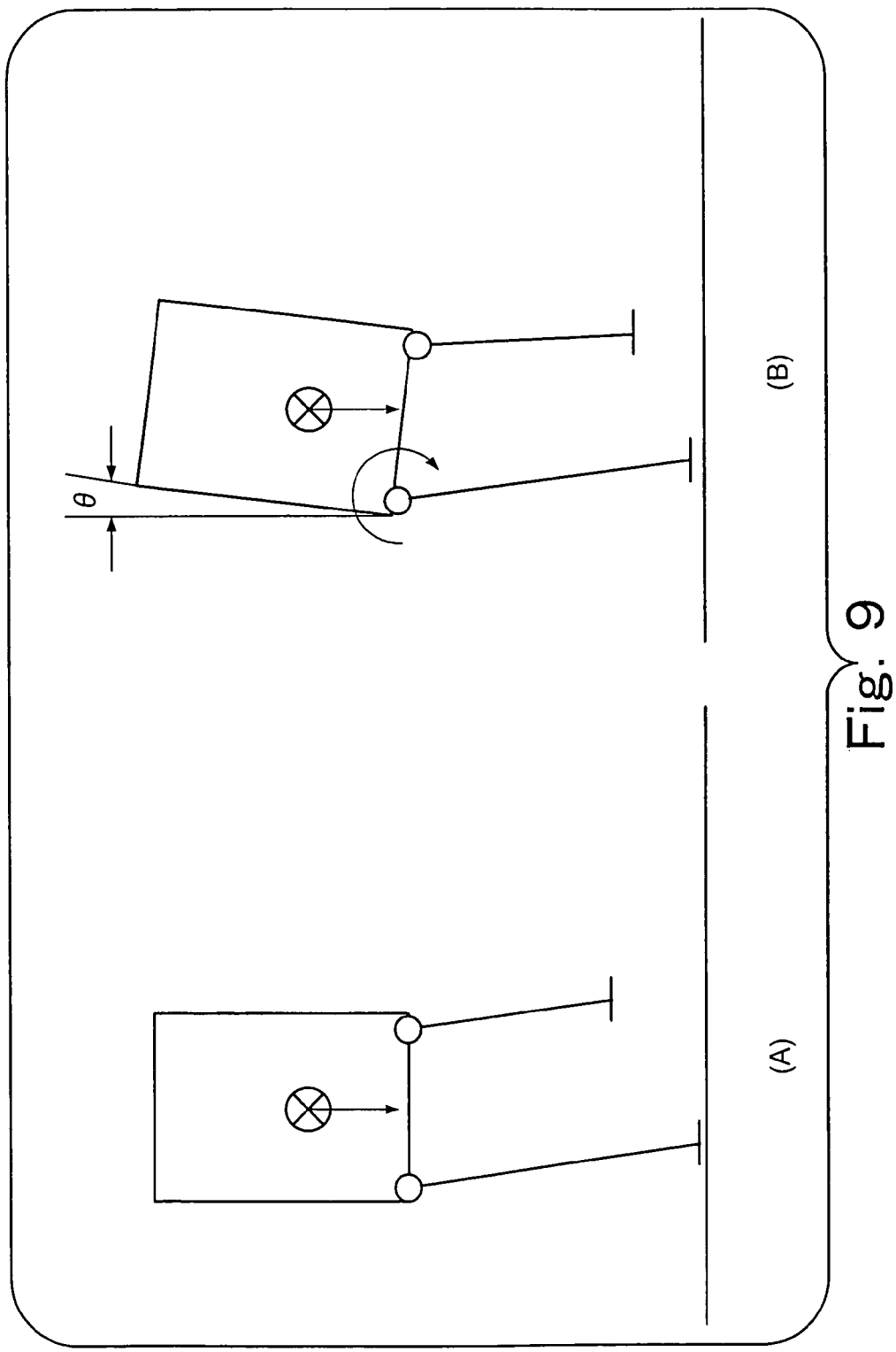
FIG. 9 is a schematic illustration showing an inclination of a body trunk by a backlash.

FIG. 9 is a schematic illustration showing an inclination of the trunk by the backlash.

Part (A) of FIG. 9 is a view showing an ideal state in which the backlash does not exist and the trunk stands up vertically.

In contrast to this, part (B) of FIG. 9 is a view showing a state in which the backlash exists and the trunk inclines by an angle θ due to the backlash. When such an inclination θ exists, the center of gravity also deviates to a position separate from the expected position, which swings the trunk left and right, thereby incapacitating a stable biped walking. Hence, here, the trunk controls the inclination θ due to the backlash.

Figure 10:
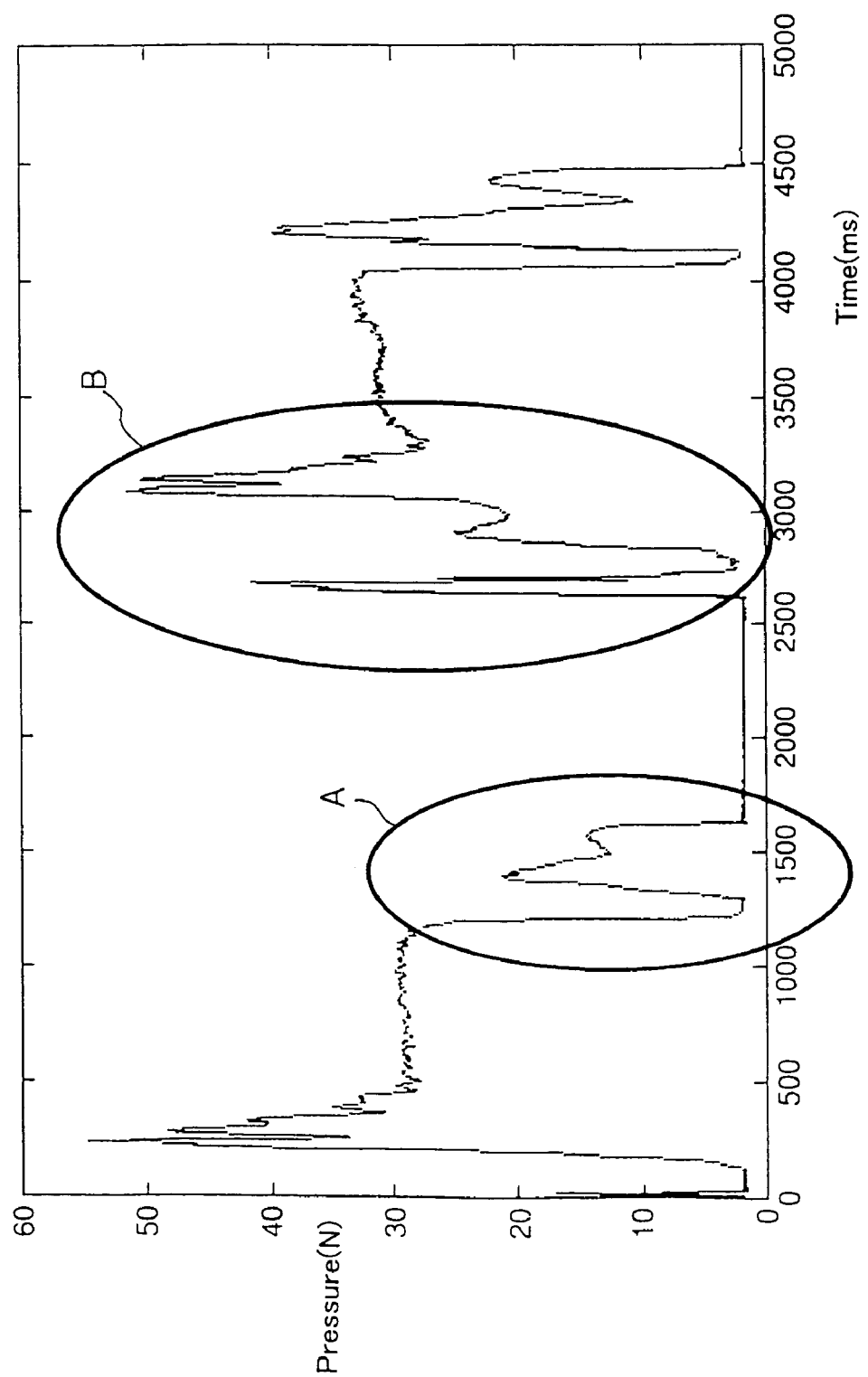
FIG. 10 is a view showing a pressure change at the biped walking time measured by a pressure sensor (not shown) disposed at a sole of the right foot of FIG. 6.

FIG. 10 is a view showing a pressure change at the time of biped walking which is measured by a pressure sensor (not shown) disposed at the sole of the right foot 210 of FIG. 6.

From among two ellipses A and B, the ellipse A is equivalent to the timing of raising the right foot, and mainly due to the backlash of the left foot, the right foot sole detaches from the floor once, and after the right foot touches the floor again, it is found that the right foot is raised. Further, the ellipse B represents the timing of the right foot touching on the floor after the swing movement, and mainly due to the backlash of the right foot itself, the pressure of the right foot sole drastically changes at random, and it is found that the movement of the right foot becomes unstable.

Figure 11:
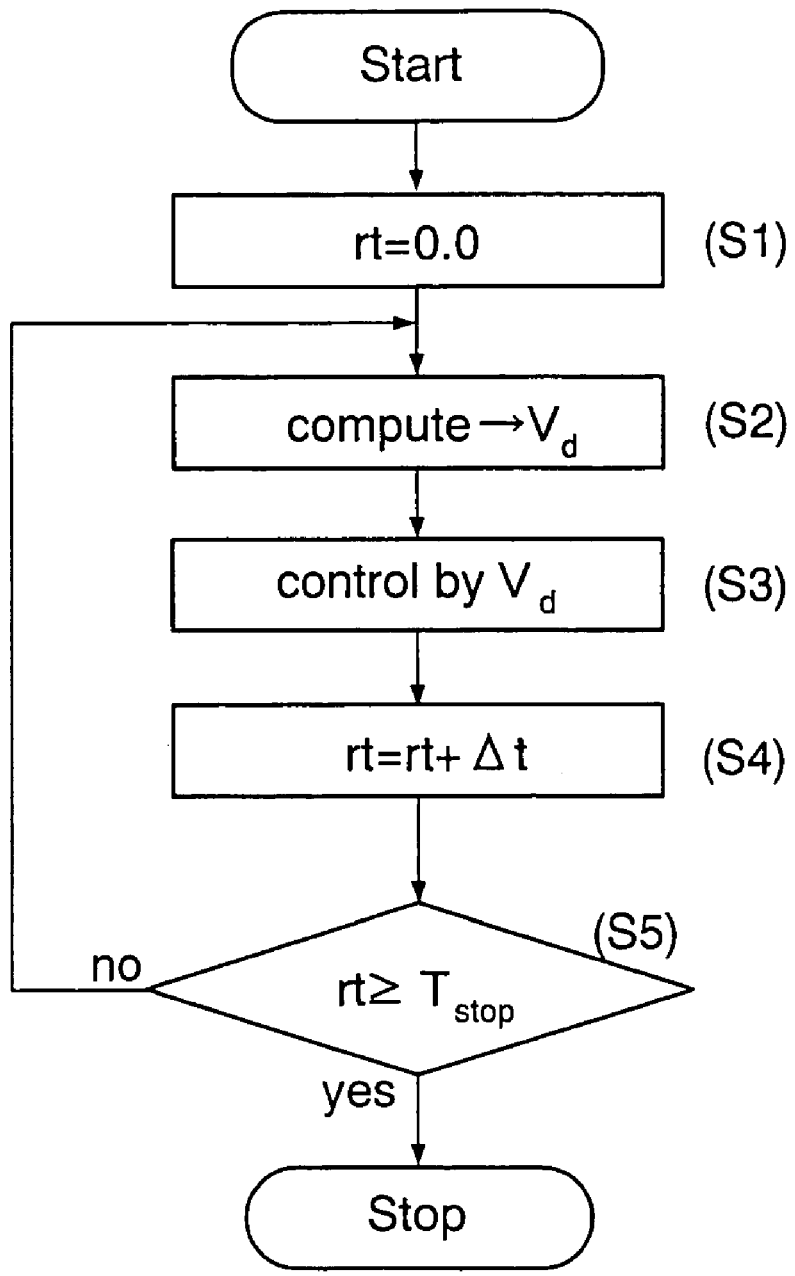
FIG. 11 is a flowchart showing an outline of a robot control algorism when the backlash is ignored.

FIG. 11 is a flowchart showing the outline of a robot control algorism at the time when the backlash is ignored.

Here, to compare with the flowchart of the present embodiment to be described later with reference to FIG. 12, the robot control algorism in an ideal state in which the backlash is ignored will be described.

Here, first, a time measurement variable rt is initialized to 0.0 (step (s1)), and the movement control value $V_d$ for controlling the movement of the robot at that point of time (point of time of rt. Here, the point of time of rt=0.0 immediately after the initialization) is calculated (step (s2)), and based on the movement control value $V_d$, the movement of the robot is controlled (step (s3)). In the robot shown in FIG. 1 or 6, there exist many joints to be controlled, but here, since a specific movement control of each joint does not pose a problem, one movement control value $V_d$ is allowed to be a representative of the remaining values concerned.

In step S4, the time variable rt is advanced by $\Delta t$, and in step (s5), it is determined whether or not the value of the time variable rt reaches a time $T_{stop}$ in which the movement of the robot is to be stopped. When the rt does not reach the $T_{stop}$ yet, steps (s2) to (s4) are repeated, and when the rt reaches the $T_{stop}$, this routine is completed.

Figure 12:
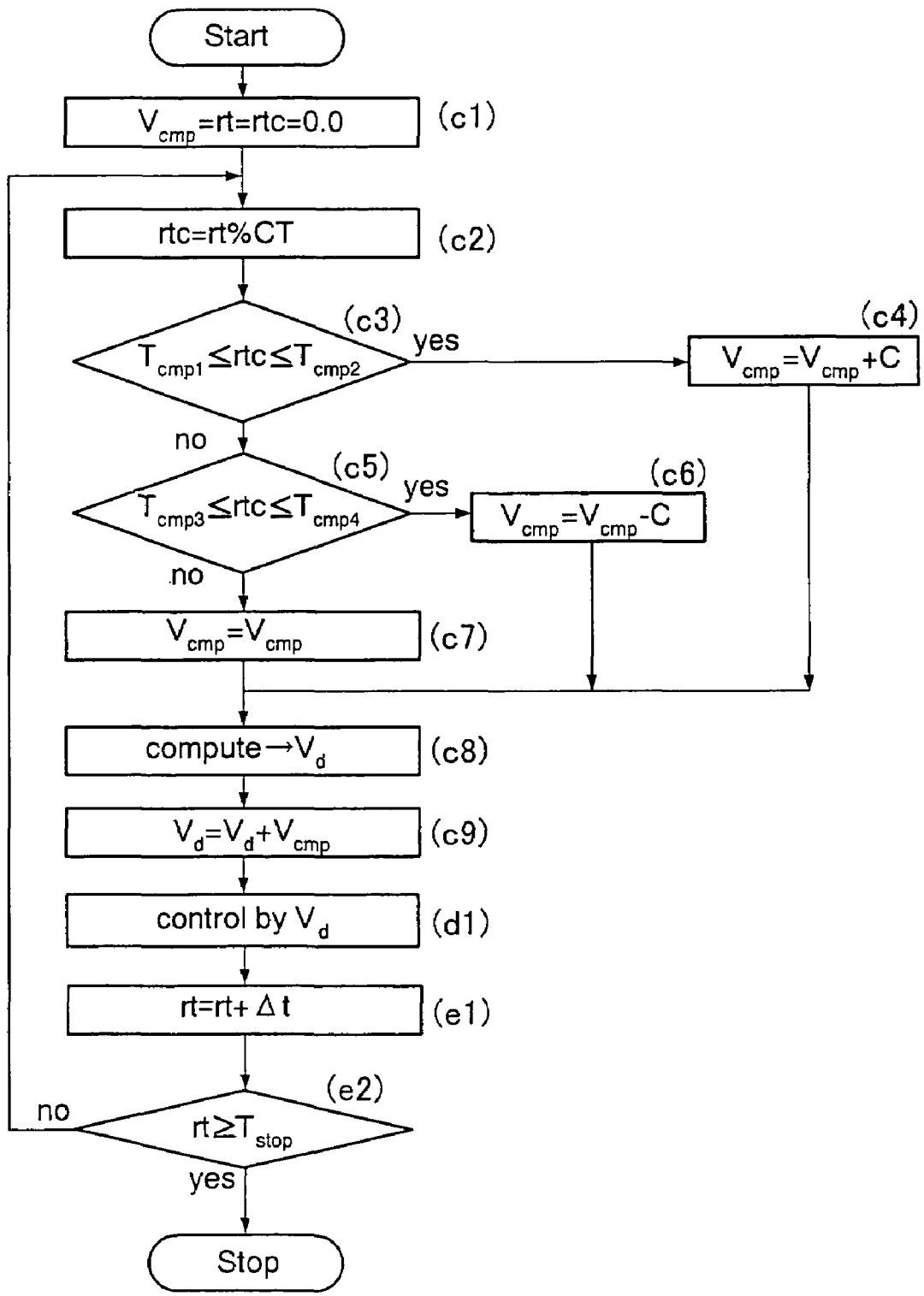
FIG. 12 is a flowchart showing the robot control algorism when the backlash is considered.

FIG. 12 is a flowchart showing the robot control algorism at the time when the backlash is considered.

In the flowchart of FIG. 12, steps (c1) to (c9), and step (d1) are equivalent to the movement control value generating step of step (c) and the movement control step of step (d) in the flowchart of the backlash compensation control method of FIG. 3, and at the same time, are also equivalent to the movement control value generating section 401 and each operation of the movement control section 402 in the backlash compensation control program 400 of FIG. 4, and each operation of the movement control value generating section 411 and the movement control section 412 of the backlash compensation controller 410 of FIG. 5.

Steps (e1) and (e2) of the flowchart of FIG. 12 are steps for allowing the generation of the movement control value and the movement control to be repeatedly performed.

In step (c1) of the flowchart of FIG. 12, each of the variables $V_{cmp}$, rt, and rtc are all initialized to 0.0. Here, the variable $V_{cmp}$ is a variable for representing a cumulative value (see step (c4)) of the correction value for correcting (see step (c9)) the movement control value $V_d$ (see step (c8)). Further, the variable rt, as described also in the flowchart of FIG. 11, is a variable for representing an elapsed time. Further, the variable rtc is a variable representing a time during a cycle of the movement of the robot, that is, here, with an eye on the biped walking of the robot of FIG. 6, as shown in FIG. 7, during a cycle including a series of biped walking from the left foot swing phase in which the left foot is raised from the both feet support phase and the left foot is advanced in one step, and a phase supported by both feet, and up to the right foot swing phase in which the right foot is raised this time and the right foot is advanced in one step. For example, assuming that this cycle is two seconds, the variable rtc marches from 0.0, and immediately after reaching 2.0, returns to 0.0 again, and repeats the same.

In step (c2) of the flowchart of FIG. 12, based on the variable rt and CT representing a time width of a cycle, the value of the variable rtc is found, and in steps (c3) and (c5), respectively, it is determined whether the variable rtc is $T_{cmp1} \leq rtc \leq T_{cmp2}$ or $T_{cmp3} \leq rtc \leq T_{cmp4}$.

Figure 13:
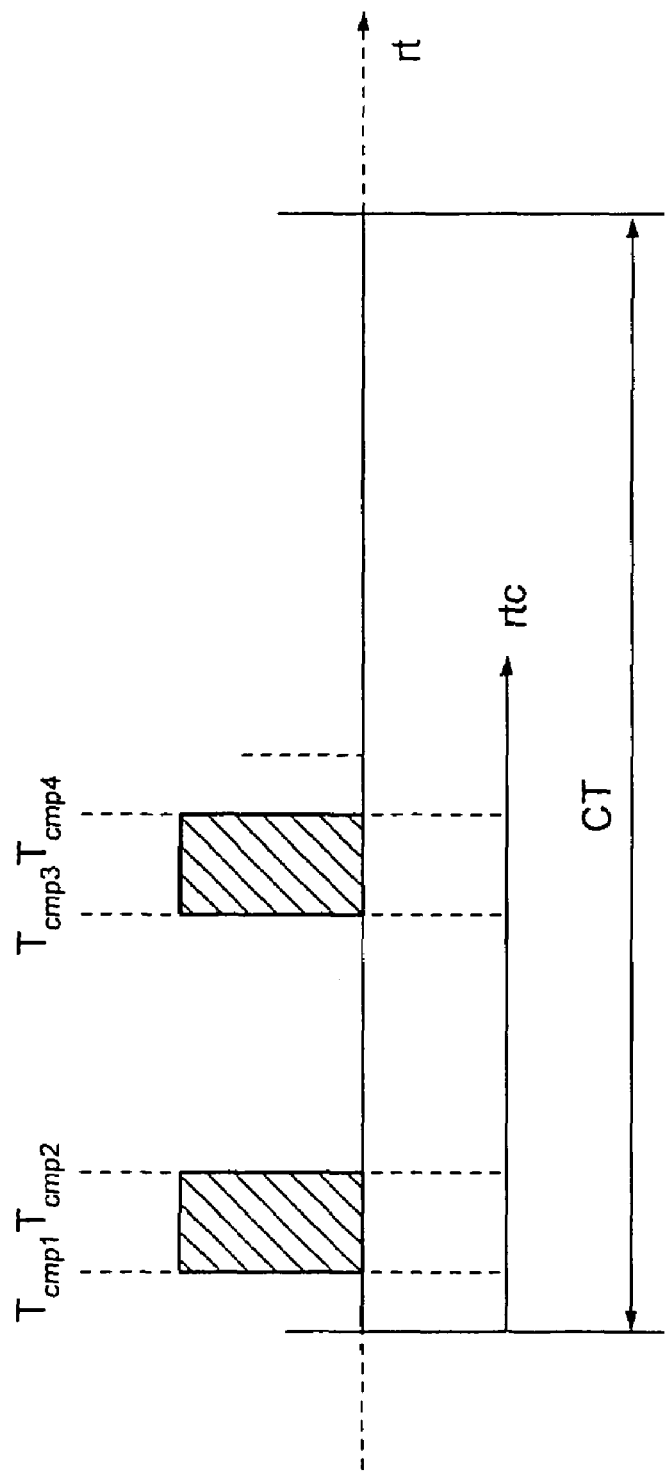
FIG. 13 is a schematic illustration representing the meaning of each variable and or a constant within a cycle of the biped walking movement of the robot.

FIG. 13 is a schematic illustration representing each of the variables within a cycle of biped walking movement of the robot or a meaning of constant.

The axis of abscissas represents a time variable rt, and CT represents a cycle within that variable. Further, the variable rtc represents an elapsed time within a cycle CT.

Further, $T_{cmp1}$ and $T_{cmp2}$ represent each time of the start point and the end point of a first period within a cycle CT, and $T_{cmp3}$ and $T_{cmp4}$ represent each time of the start point and the end point of a second cycle within a cycle CT.

Here, the first period regulated by two variables $T_{cmp1}$ and $T_{cmp2}$ represents a period in which the effect of the backlash within a cycle CT as shown, for example, by the ellipse A in FIG. 10 strongly emerges, and the second period regulated by two variables $T_{cmp3}$ and $T_{cmp4}$ represents another period in which the effect of the backlash within a cycle CT as shown, for example, by the ellipse B in FIG. 10 strongly emerges. Here, a cyclic movement such as the biped walking is scheduled, and the effect of the backlash typically emerges in the two periods within a cycle as shown in FIG. 10. In the present embodiment, the first and second periods set the same time width.

Returning to FIG. 12, the description will be continued.

In step (c3) of FIG. 12, it is determined whether or not $T_{cmp1} \leq rtc \leq T_{cmp2}$, that is, whether or not at present it is a time within the first period, and when it is the time within the first period, a correction value C is added to the variable $V_{cmp}$ which represents the cumulative value of the correction value C (step (c4)). Further, in step (c5) of FIG. 12, it is determined whether or not $T_{cmp3} \leq rtc \leq T_{cmp4}$, that is, whether or not at present it is a time within the second period, and when it is the time within the second period, the correction value C is subtracted from the variable $V_{cmp}$ (step (c6)). When it is neither within the first period nor within the second period at present, the value of the variable $V_{cmp}$ is kept as it is (step (c7)).

After going through the calculation of the cumulative value $V_{cmp}$ of the correction value, the current movement control value $V_d$ is calculated (step (c8)), and the calculated movement control value $V_d$ is added with the variable $V_{cmp}$, thereby finding a new movement control value $V_d$ (step (c9)), and based on the new movement control value $V_d$ thus found, the movement of the robot is controlled (step (d1)).

After that, the time variable rt is advanced by $\Delta t$ (step (e1)), the processing of steps (c2) to (e1) is repeated until reaching a movement stopping time $T_{stop}$ (step (e2)).

Here, the unit time $\Delta t$ which advances the time is a micro time in which the robot can sufficiently smoothly move, and steps (c2) to (e1) are repeated for every micro time $\Delta t$. Consequently, the variable $V_{cmp}$ is cumulatively added with the correction value C for every $\Delta t$ time within the first period, and the correction value C is cumulative subtracted within the second period. Here, the first and second periods are periods mutually having the same time width, and consequently, at the end point of the second period, the second period returns to the state $V_{cmp}(=0.0)$ before being added with the correction value C.

Here, in contrast to the present invention, the movement control value $V_d$ simply calculated at step (c8) is referred to as a first movement control value in the present invention, and the movement control value after added with the variable $V_{cmp}$ after the correction value is cumulatively added within the first period is referred to as a second movement control value in the present invention. That is, in step (d1), during an interval from the end point of the second period just before a cycle to the start point of the first period of one cycle of this time, based on an uncorrected (added with the variable $V_{cmp}=0.0$ at step (c9)) first movement control value, the movement of the robot is controlled, and during an interval from the end point of the first period to the state point of the second period, based on the maximally corrected second movement control value (added with the maximum value of the variable $V_{cmp}$ at step (c9)), the movement of the robot is controlled, and during the first period, based on the movement control value changing from the first movement control value to the second movement control value successively with time, the movement of the robot is controlled, and during the second period, based on the movement control value changing from the second movement control value to the first movement control value successively with time, the movement of the robot is controlled.

What becomes a problem here is how to decide each start point $T_{cmp1}$ and $T_{cmp3}$ and each end point $T_{cmp2}$ and $T_{cmp4}$ of the first and second periods, and the correction value C.

The start points and end points $T_{cmp1}$ to $T_{cmp4}$ of the first and second periods can be decided, for example, from the data as shown in FIG. 10. Although this decision may be performed by an operator and inputted into the computer 100 (see FIG. 1), it may be automatically performed by seizing the period in which data such as a pressure and the like sharply changes or by directly detecting the backlash. Although the time width shown in the ellipse A of FIG. 10 where an adverse effect of the backlash emerges and the time width shown in the ellipse B of FIG. 10 where an adverse effect of the backlash emerges are mutually different, the first and second periods can be set to the same time width. Alternately, though the first and second periods may be set to a mutually different time width, at that time, it is necessary that the correction value C of step (c4) and the correction value C of step (c6) of FIG. 12 are set different so that, at the end point of the second period, $V_{cmp}=0.0$.

Next, a deciding method of the correction value C will be described.

Here, the same algorism as the algorism shown in the flowchart of FIG. 12 is adapted, and the movement control of the robot is performed by using various values as the correction value C. However, here, the movement control (moving simulation) of the robot is performed on the data constructed within the computer 100 of FIG. 1, and an adequate value of the correction value C is decided as follows. With the object of confirming the adequate value or with the object of searching for more accurate adequate value, the correction value may be changed by a value close to the adequate value found by the simulation to perform an actual movement control of the robot.

Here, though the illustration will be omitted, the same algorism as the algorism shown in the flowchart of FIG. 12 is adapted, and by variously changing the correction value C of FIG. 12, the robot is moved on the simulation, and the inclination θ (see FIG. 9) of the trunk of the robot is measured. This is equivalent to the corresponding relation generating step of step (a) of the backlash compensation control method of FIG. 3, and also is equivalent to the operations of the corresponding relation generating section 403 of the backlash compensation control program 400 of FIG. 4 and the corresponding control section 413 of the backlash compensation control section 410 of FIG. 5.

Figure 14:
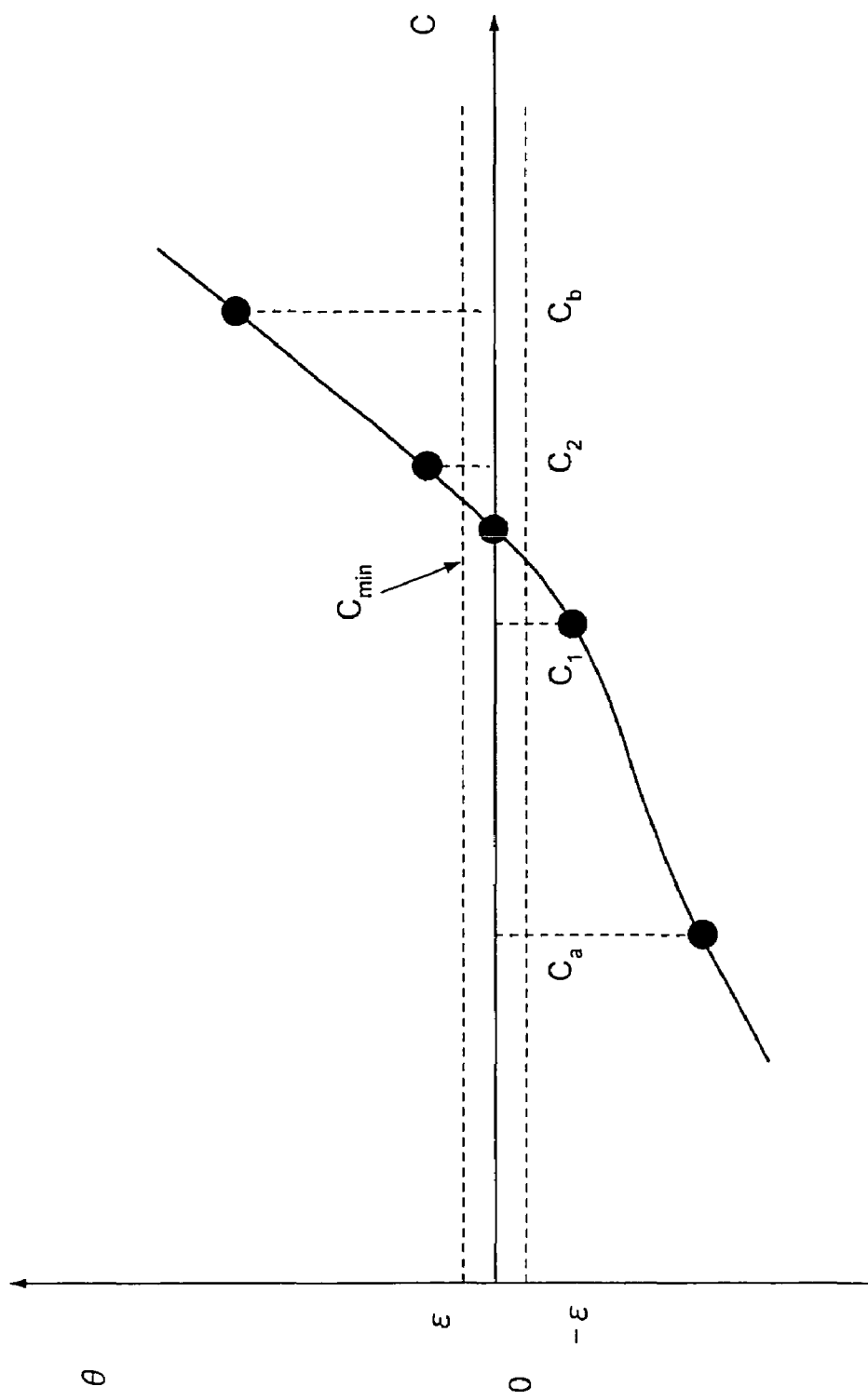
FIG. 14 is a graph showing a corresponding relation between a correction value C and an inclination θ of the robot (see FIG. 9) obtained as described above.

FIG. 14 is a graph showing the corresponding relation between the correction value C and the inclination θ (see FIG. 9) of the robot found as described above.

Here, based on the graph shown in FIG. 14, the correction value $C_{min}$ which is $+\epsilon \leq \theta \leq -\epsilon$, is found, and when the movement of the robot is actually controlled, the obtained value $C_{min}$ is used as the correction value C of FIG. 12.

Figure 15:
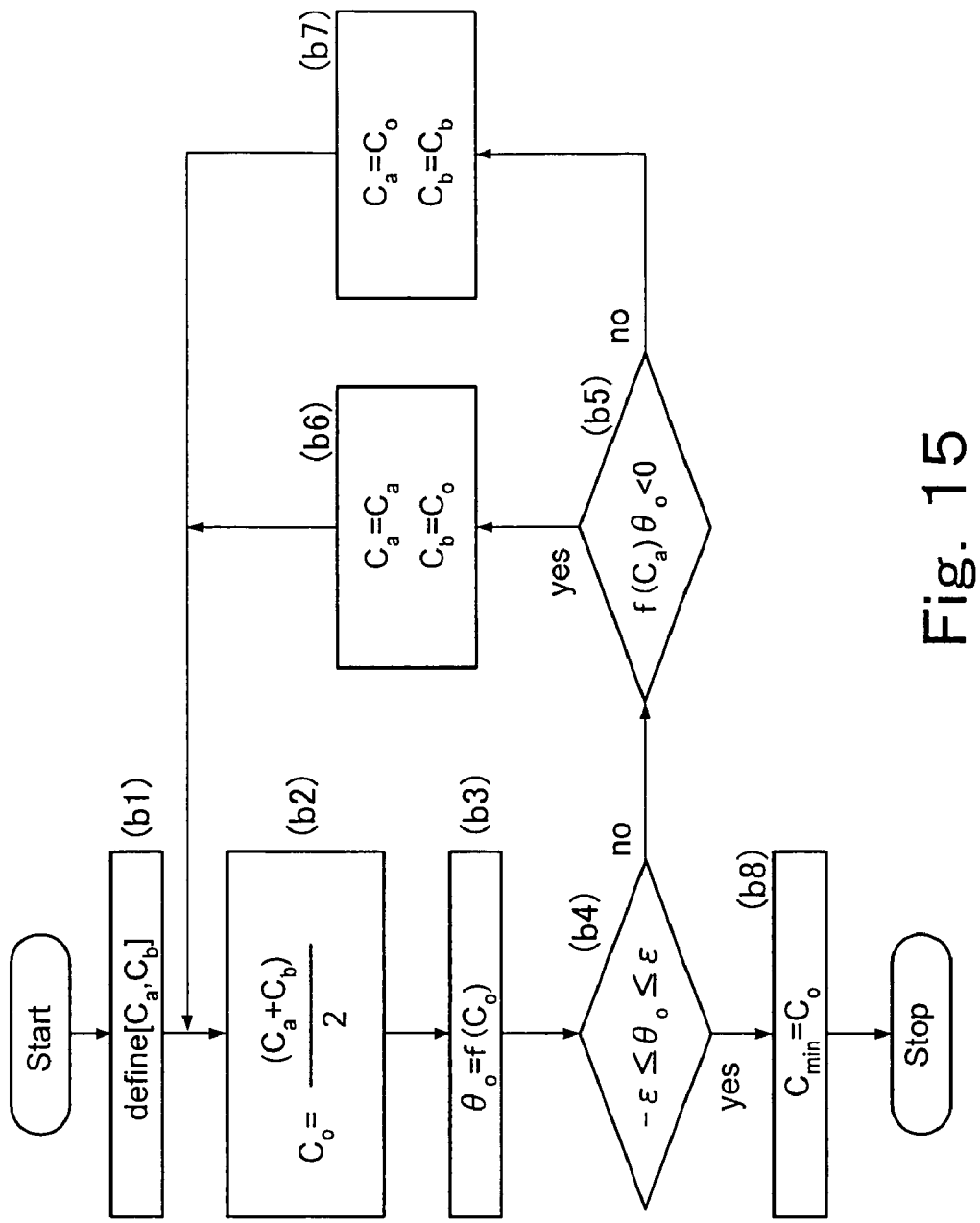
FIG. 15 is a flowchart showing a decided algorism of a compensation value $C_{min}$.

FIG. 15 is a flowchart showing the decided algorism of the correction value $C_{min}$.

This flowchart of FIG. 15 is equivalent to the correction computing step of step (b) in the backlash compensation control method of FIG. 3, and at the same time, is equivalent to the operations of the correction value computing section 404 of the backlash compensation control program 400 of FIG. 4 and the correction value computing section 414 of the backlash compensation controller 410 of FIG. 5.

In step (b1) of FIG. 15, when the function of FIG. 14 is represented by θ=f (C), $$f(C_a) \cdot f(C_b) < 0 \tag{1}$$

which selects two correction value variables $C_a$ and $C_b$, and in step (b2), a variable as an average value of these two variables $C_a$ and $C_b$ is found as follows, $$C_0 = (C_a + C_b)/2 \tag{2}$$

and at step (b3), the inclination angle corresponding to the variable $C_0$ as the average value is found as follows, $$\theta_0 = f(C_0) \tag{3}$$

At step (b4), it is determined whether or not the inclination angle $\theta_0$ thus found is within the range of $$-\epsilon \leq \theta_0 \leq \epsilon_0 \tag{4}$$

and when $\theta_0$ is out of this range, at step (b5), it is determined whether or not $$f(C_a) \cdot \theta_0 < 0 \tag{5}$$

When the expression (5) is satisfied, the process advances to step (b6), and the variable $C_0$ is adapted as the variable $C_b$ or when the expression (5) is not satisfied, the process advances to step (b7), and the variable $C_0$ is adapted as the variable $C_a$, and the process returns to (b2), and according to the expression (2), a new average value $C_0$ is found again.

When this process is repeated, the inclination angle $\theta_0$ found at step (b3) is converged on $\theta_0=0$, and when the converged $\theta_0$ is found until the condition of the expression (4) is satisfied at step (b4), $C_0$ (step b3) (see the expression (3)) corresponding to that $\theta_0$ is found as the correction value $C_{min}$ (step (b8)).

The correction value $C_{min}$ thus found is a correction value which makes the inclination angle θ (see FIG. 9) of the robot almost 0.0 when the movement of the robot is controlled according to the flowchart shown in FIG. 12, and on the occasion of controlling the movement of the robot according to the flowchart shown in FIG. 12, as the correction value C in FIG. 12, the correction value $C_{min}$ thus found is adapted.

The experiment result showing that the adverse effect of the backlash is effectively reduced by the movement control will be described below.

The experiment result shown here is a result of having conducted the biped walking movement control of the biped walking robot schematically shown in FIG. 6.

Figure 16:
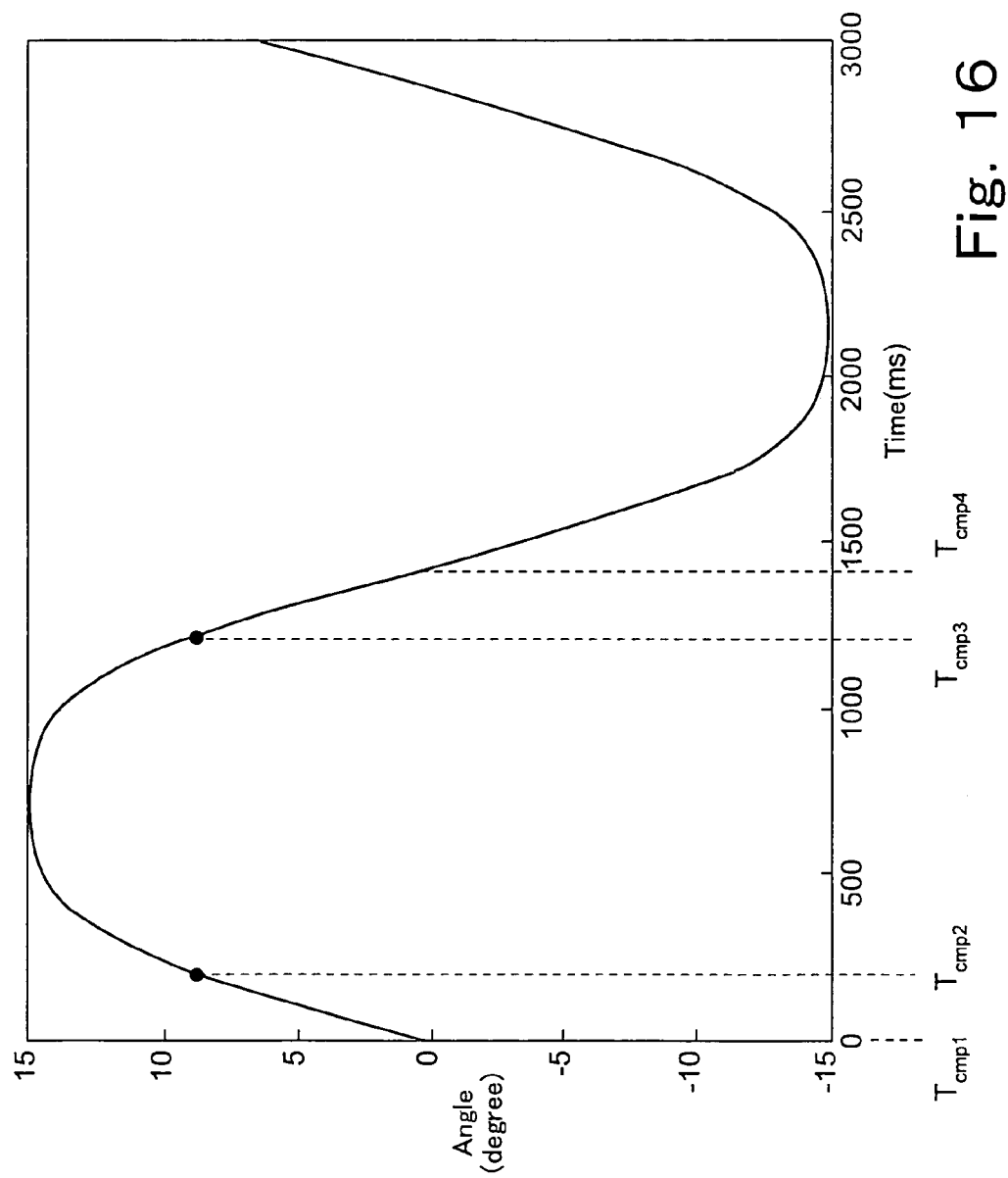
FIG. 16 is a view showing an angle of the hip roll joint of the right foot shown in FIG. 6.

FIG. 16 is a view showing the angle of the hip roll joint 211 of the right foot 210 shown in FIG. 6.

Here, a cycle CT equivalent to having walked two steps by one step each of the left and right feet is CT=2.85 sec., and assuming that a time constant $C_{dp}=0.73$ seconds, the start point $T_{cmp1}$ and the end point $T_{cmp2}$ of the first period and the start point $T_{cmp3}$ and the end point $T_{cmp4}$ of the second period were set, respectively, as follows:

$T_{cmp1}=0.0$ sec.

$T_{cmp2}=C_{dp}/4=0.1825$ sec.

$T_{cmp3}=CT/2-C_{dp}/4=1.2455$ sec.

$T_{cmp4}=CT/2=1.425$ sec.

After that, according to the algorism, the correction value $C=C_{min}$ was decided.

As a result, the correction value C was decided as C=0.001

Here, a real time control cycle Δt (see step (e1) of FIG. 12) is Δt=1.0 (milli-sec).

By using the correction value C thus found, the movement control of the robot was performed according to the algorism of FIG. 12. FIG. 16 shows the angle of the hip roll joint 211 of the right foot, and with respect to the left foot, the same backlash compensation control was performed.

Figure 17:
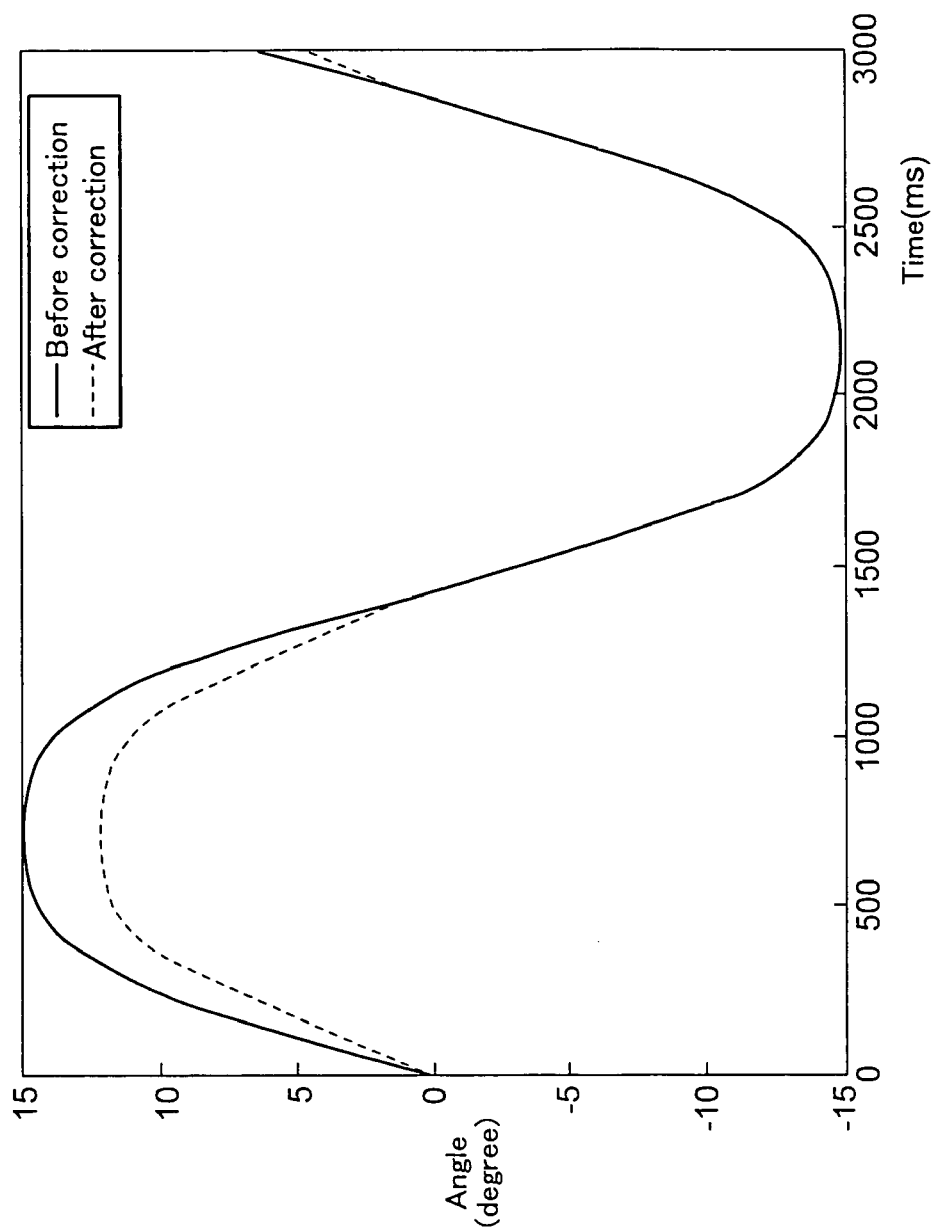
FIG. 17 is a view showing an angle of the hip roll joint of the right foot before and after the backlash compensation.

FIG. 17 is a view showing the angle of the hip roll joint 211 of the right foot before and after the backlash compensation.

The graph before the correction (solid line) is the same graph as FIG. 16, and in the graph showing the angle after the correction shown by a broken line, it is found that the portion caused by the backlash is controlled.

Figure 18:
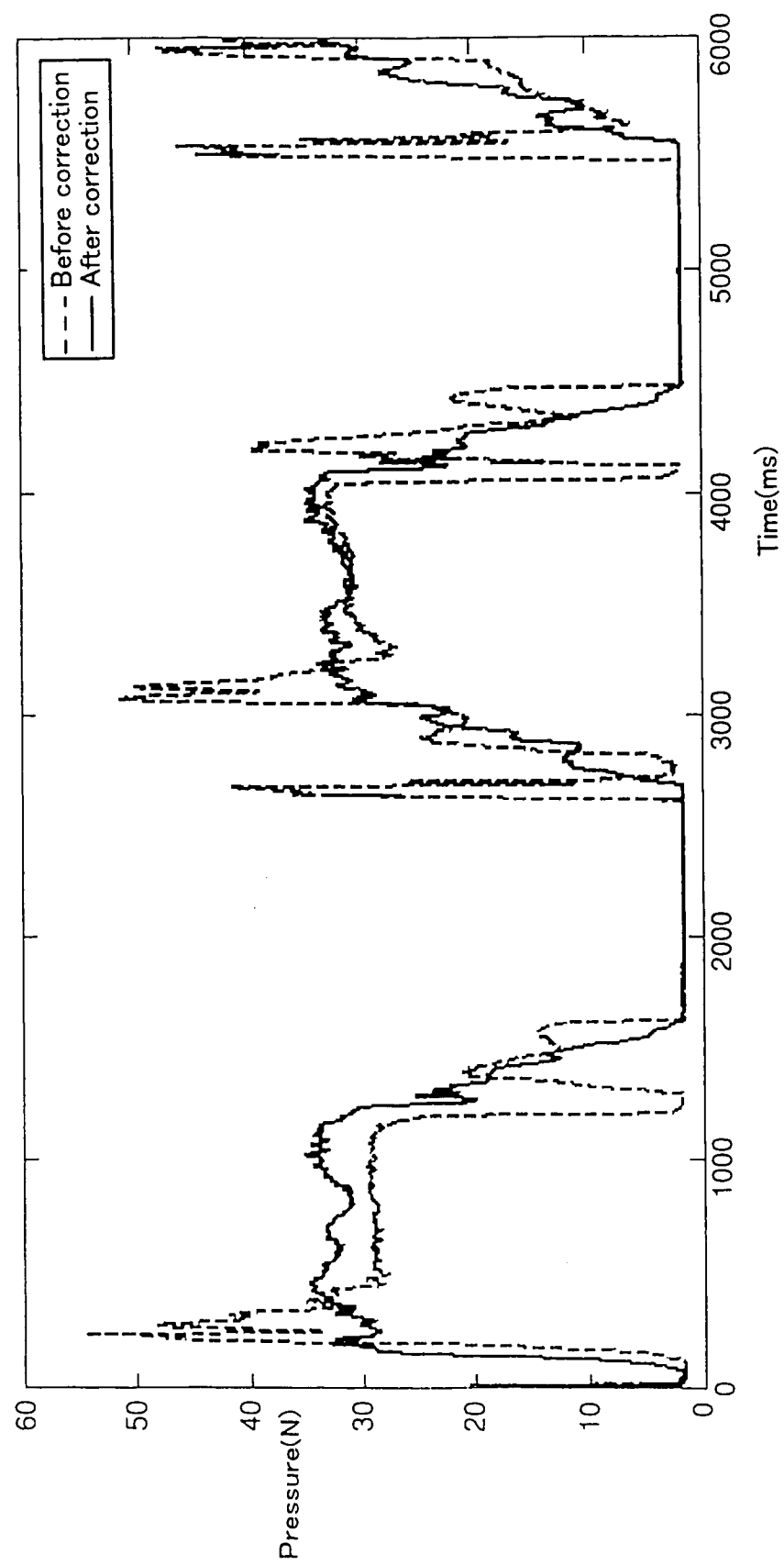
FIG. 18 is a view showing the pressure change before and after the correction of the pressure sensor of the right foot sole.

FIG. 18 is a view showing the pressure change before and after the correction of the pressure sensor of the right foot sole.

From this FIG. 18, it is found that the pressure change is large before the correction (broken line), and the pressure fluctuation is mild after the correction (solid line).

Figure 19:
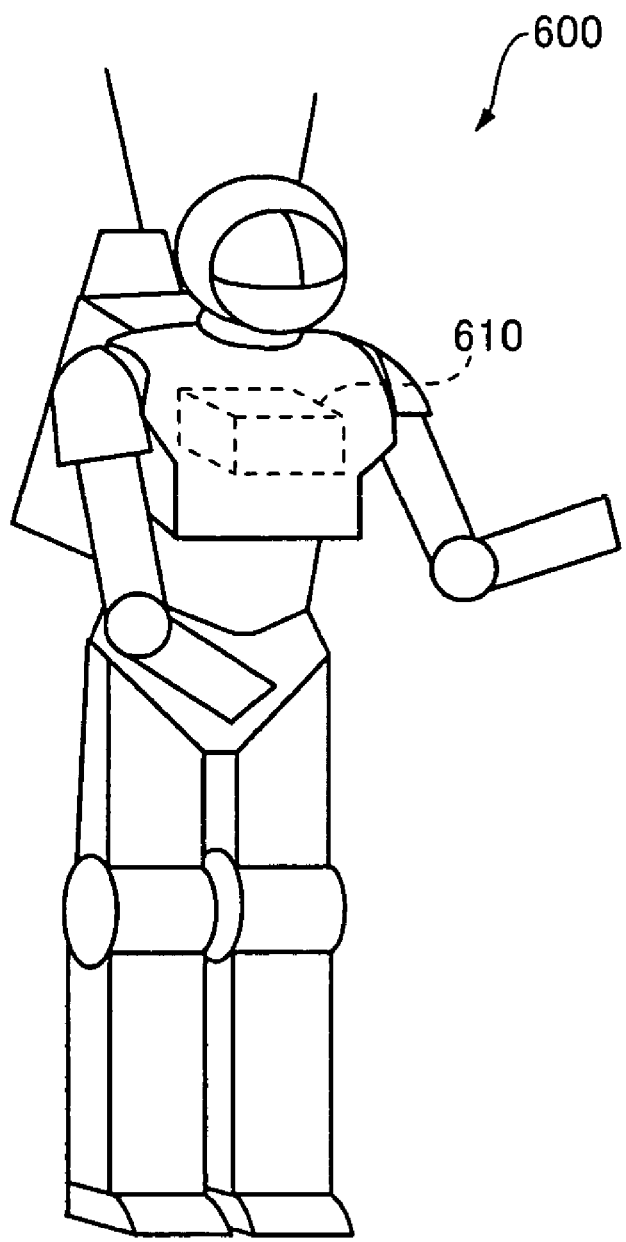
FIG. 19 is an external view of the robot built into one embodiment of the backlash compensation controller of the present invention.

FIG. 19 is an external view of the robot built with one embodiment of the backlash compensation controller of the present invention.

This robot 600 is equivalent to a robot incorporating the backlash compensation controller realized by the compute 100 of FIG. 1 into the interior of the robot 200 itself shown in FIG. 6.

That is, this robot 600 has the backlash compensation controller 610 which controls this robot itself built in.

Figure 20:
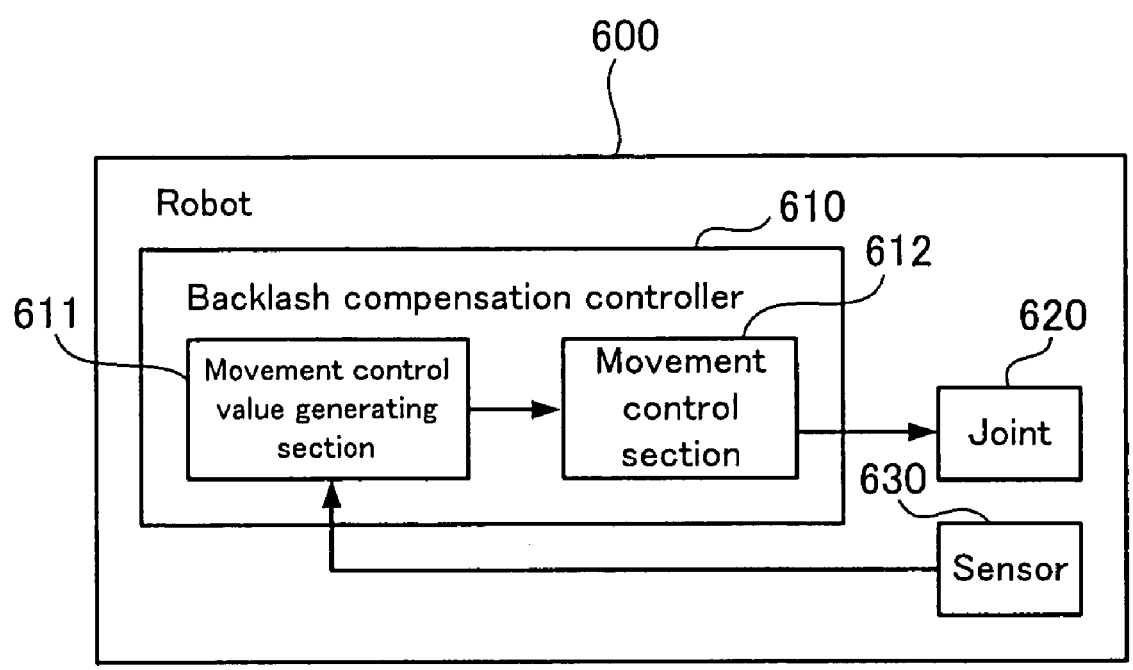
FIG. 20 is a block diagram showing the constitution of the robot of FIG. 19.

FIG. 20 is a block diagram showing the configuration of the robot 600 of FIG. 19.

This robot 600 includes a backlash compensation controller 610, a joint 620 controlled in its movement by the backlash compensation controller 610, and a sensor 630 for measuring the movement of its joint.

The backlash compensation controller 610 of this robot 600 is constituted by a movement control value generating section 611 and a movement control section 612.

This backlash compensation controller 610 is not provided with an element equivalent to the corresponding relation generating section 413 and the correction value computing section 414 which are provided for the backlash compensation controller 410 shown in FIG. 5, and various variables and constants adapted in the movement control value generating section 611 of the backlash compensation controller 610 of FIG. 20 are found in advance according to the algorism and are stored in advance in the movement control value generating section 611, and by using values of various types stored in advance, this backlash compensation controller 610 of FIG. 20 controls the movement of the robot 600 (see FIG. 19) built with the back lash compensation controller 610 according to the algorism shown in the flowchart of FIG. 12.

In this manner, the backlash compensation controller 610 may as well include the movement control value generating section 611 and the movement control section 612 at the stage of controlling the robot, and the element equivalent to the corresponding relation generating section 413 and the correction value computing section 414 in the backlash compensation controller 410 shown in FIG. 5 is not required. The same holds true with the case of the backlash compensation program, and in the case of the backlash compensation program for performing the movement control only of the robot, the corresponding relation generating section 403 and the correction value computing section 404 of the backlash compensation control program 400 shown in FIG. 4 are not required.

Further, the backlash compensation controller may be constituted as a separate entity from the robot or may be built into the robot of the control object as shown in FIG. 19.

The invention claimed is:

1. A backlash compensation control method of allowing a robot performing a cyclic movement upon receipt of a driving force transmitted through a driving force transmission system which transmits a driving force from a driving source along with a backlash to perform the movement compensated for the backlash, comprising:
   a first step of generating a movement control value which controls the movement of the robot, said first step includes:
      repeatedly cumulatively adding a first predetermined correction value to a predetermined first movement control value during a predetermined first period when a fault movement caused by the backlash within a cycle of the movement of the robot is possible to occur, so as to be gradually biased to a predetermined second movement control value over the first period, and
      repeatedly cumulatively subtracting a predetermined second correction value from the second movement control value during a predetermined second period when a fault movement caused by the backlash within that cycle is possible to occur, so as to gradually return to the predetermined first movement control value over the second period; and
   a second step of controlling the movement of the robot based on the movement control value thus generated.

2. The backlash compensation control method according to claim 1, wherein the first movement control value and second movement control value are movement control values which change with the time.

3. The backlash compensation method according to claim 1, wherein the first period and second period are periods having substantially the same time width, and the first correction values and second correction value are substantially the same correction values.

4. The backlash compensation control method according to claim 1, comprising:
   a third step, in which a same algorism as the movement control value generating algorism in the first step is used, and at the same time, by using each of plural mutually different correction values as the correction values corresponding to the first correction value in the first step, a moving test of the robot is performed, thereby finding a corresponding relation between the correction value and a degree of the compensation of the backlash, and
   a fourth step of finding the correction value by which the compensation of the backlash is adequately performed based the corresponding relation,
   whilst, in the first step, the correction value found in the fourth step is adapted as the first correction value.

5. A backlash compensation controller allowing a robot performing a cyclic movement upon receipt of a driving force transmitted through a driving force transmission system which transmits a driving force from a driving source along with a backlash to perform the movement compensated for the backlash, comprising:

a movement control value generating section to generate a movement control value which controls the movement of the robot, in which, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period when a fault movement caused by the backlash within that cycle is possible to occur, a predetermined second correction value is repeatedly cumulatively subtracted from the second movement control value so as to gradually return to the predetermined first movement control value over the second period; and a movement control section which controls the movement of the robot based on the movement control value generated by the movement control value generating section.

6. A backlash compensation control program storage medium storing a backlash compensation control program that is executed within a computer which executes a program, the computer allowing a robot performing a cyclic movement upon receipt of a driving force transmitted through a driving force transmission system which transmits a driving force from a driving source along with a backlash to perform the movement compensated for the backlash, the backlash compensation control program allowing the computer to operate as a backlash compensation controller, comprising:

a movement control value generating section which generates a movement control value to control a movement of the robot, in which, during a predetermined first period when a fault movement caused by the backlash within a cycle of the movement of the robot is possible to occur, a predetermined first movement control value is repeatedly cumulatively added with a first predetermined correction value so as to be gradually biased to a predetermined second movement control value over the first period, and at the same time, during a predetermined second period when a fault movement caused by the backlash within that cycle is possible to occur, a predetermined second correction value is repeatedly cumulatively subtracted from the second movement control value so as to gradually return to the predetermined first movement control value over the second period; and a movement control section which controls the movement of the robot based on the movement control value generated by the movement control value generating section.

* * * * *